US008343572B2

(12) United States Patent
Varade et al.

(10) Patent No.: US 8,343,572 B2
(45) Date of Patent: Jan. 1, 2013

(54) COMPOSITION OF ELECTRODE MATERIAL IN THE FORM OF A COATING AND A PROCESS THEREOF

(76) Inventors: Ashish Varade, Karnataka (IN); Ajjampur Srinivasarao Shivashankar, Karnataka (IN); Sukanya Dhar, Karnataka (IN); Srinivasan Sampath, Karnataka (IN)

( * ) Notice: Subject to any disclaimer, the term of this patent is extended or adjusted under 35 U.S.C. 154(b) by 452 days.

(21) Appl. No.: 12/673,726

(22) PCT Filed: Aug. 29, 2007

(86) PCT No.: PCT/IN2007/000372
§ 371 (c)(1),
(2), (4) Date: Feb. 16, 2010

(87) PCT Pub. No.: WO2009/022351
PCT Pub. Date: Feb. 19, 2009

(65) Prior Publication Data
US 2011/0110019 A1    May 12, 2011

(51) Int. Cl.
*B05D 5/12*    (2006.01)
(52) U.S. Cl. .... 427/78; 427/122; 427/126.3; 427/249.1; 427/255.31
(58) Field of Classification Search .............. 427/78, 427/122, 126.3, 249.1, 255.31
See application file for complete search history.

(56) References Cited

U.S. PATENT DOCUMENTS

| | | |
|---|---|---|
| 4,862,328 A | 8/1989 | Morimoto et al. |
| 5,079,674 A | 1/1992 | Malaspina |
| 5,136,473 A | 8/1992 | Tsuchiya et al. |
| 5,369,546 A | 11/1994 | Saito et al. |
| 5,501,922 A | 3/1996 | Li et al. |
| 5,557,497 A | 9/1996 | Ivanov et al. |
| 5,581,438 A | 12/1996 | Halliop |
| 5,585,999 A | 12/1996 | De Long |
| 6,205,016 B1 | 3/2001 | Niu |
| 6,491,789 B2 | 12/2002 | Niu |
| 6,710,366 B1 | 3/2004 | Lee et al. |
| 6,737,445 B2 | 5/2004 | Bell et al. |
| 6,818,118 B2 | 11/2004 | Kinlen et al. |

(Continued)

FOREIGN PATENT DOCUMENTS
DE    10312999 A1    10/2004
(Continued)

OTHER PUBLICATIONS

Lee, Chia Ying, et al., "Characteristics and Electrochemical Performance of Supercapacitors with Manganese Oxide-Carbon Nanotube Nanocomposite Electrodes." Journal of the Electrochemical Society, 152, (4) A716-A720 (2005).*

(Continued)

*Primary Examiner* — Bret Chen
(74) *Attorney, Agent, or Firm* — Lathrop & Gage LLP

(57) ABSTRACT

The present invention is in relation to a composition of electrode material in the form of a coating, said composition represented by formula $Mn_{1-x}O/C$, wherein $Mn_{1-x}O$ is the monoxide of manganese with x is $\geq 0$ and $\leq 0.1$ and C is carbon. In addition, the invention also provides a process for deposition of aforementioned composition in the form of a nanocomposite coat on the electrode of an electrochemical capacitor in the fields of automobile, aerospace engineering and applications, very large scale integrated circuits (VLSI) technology, micro-electro-mechanical systems (MEMS) and combinations thereof.

9 Claims, 10 Drawing Sheets

U.S. PATENT DOCUMENTS

Figure 1:
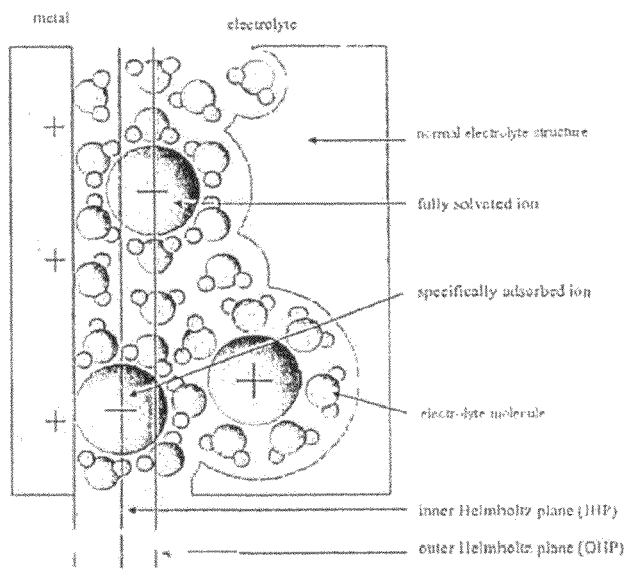

| | | | |
|---|---|---|---|
| 2002/0008956 | A1 | 1/2002 | Niu |
| 2002/0150694 | A1* | 10/2002 | Ye et al. .................. 427/446 |
| 2003/0203275 | A1* | 10/2003 | Sotomura et al. .............. 429/50 |
| 2006/0188784 | A1* | 8/2006 | Sudoh et al. .................. 429/232 |
| 2006/0227496 | A1* | 10/2006 | Schott et al. .................. 361/503 |
| 2007/0111100 | A1* | 5/2007 | Bito et al. ................ 429/231.95 |
| 2007/0111101 | A1* | 5/2007 | Ohkubo et al. ............... 429/232 |

FOREIGN PATENT DOCUMENTS

| | | |
|---|---|---|
| EP | 0685859 B1 | 8/1997 |
| EP | 134670 A1 | 10/2003 |
| JP | 2005078800 A | 3/2005 |
| WO | 2004027899 A2 | 4/2004 |

OTHER PUBLICATIONS

Subramanian, V., et al., "Synthesis and electrochemical characterizations of amorphous manganese oxide and single walled carbon nanotube composites as supercapacitor electrode materials". Electrochemistry Communications 8 (2006) 827-832.*

Fan, Zhen, et al., "Preparation and characterization of manganese oxide/CNT composites as supercapacitive materials". Diamond & Related Materials 15 (2006) 1478-1483.*

Wang, Ning, et al., "Binder-Free Manganese Oxide/Carbon Nanomaterials Thin Film Electrode for Supercapacitors". ACS Appl. Mater. Interfaces 2011, 3, 4185-4189.*

Xie, Xiaofeng, et al., "Characterization of a manganese dioxide/carbon nanotube composite fabricated using an in situ coating method." Carbon 45 (2007) 2365-2373.*

Zhou, Y.K., et al., "Hydrous manganese oxide/carbon nanotube composite electrodes for electrochemical capacitors". J. Solid State Eletrochem (2004) 8: 482-487.*

PCT/N2007/000372 International Search Report & Written Opinion mailed Jul. 18, 2008, 5 pages.

* cited by examiner

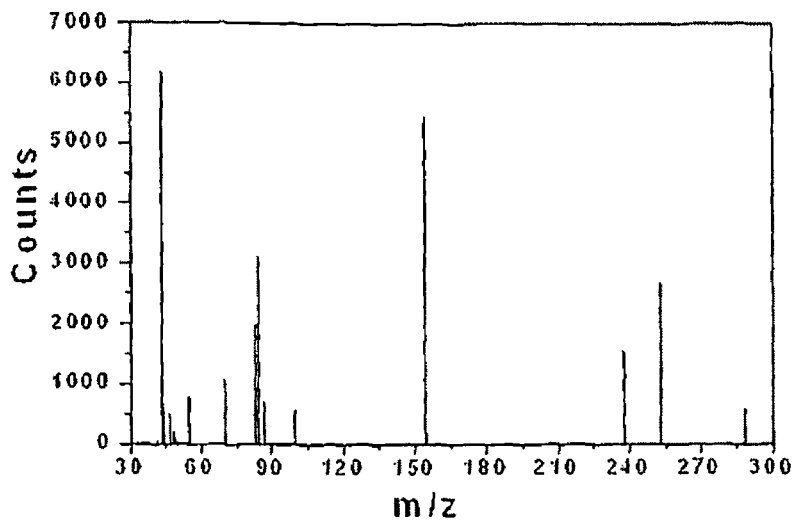
Figure: 5
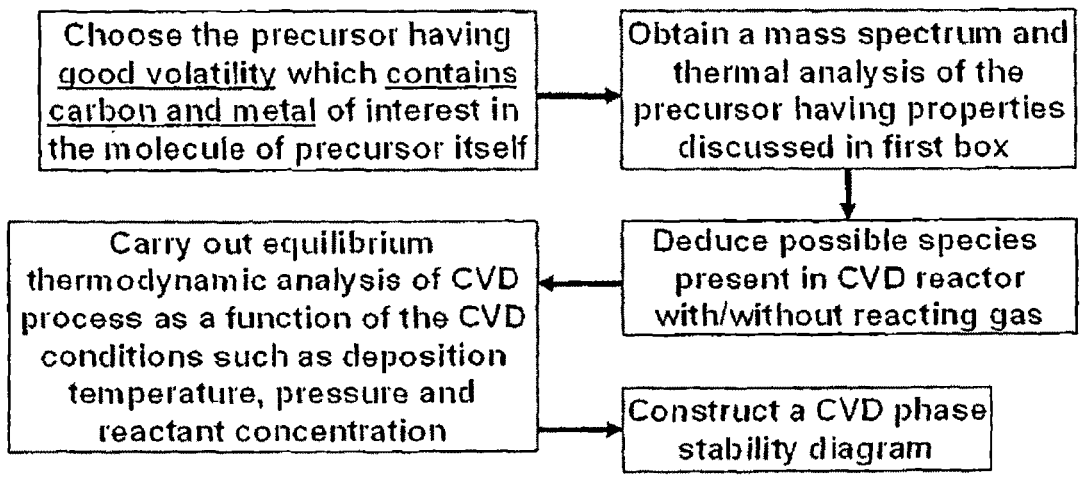
Figure 6

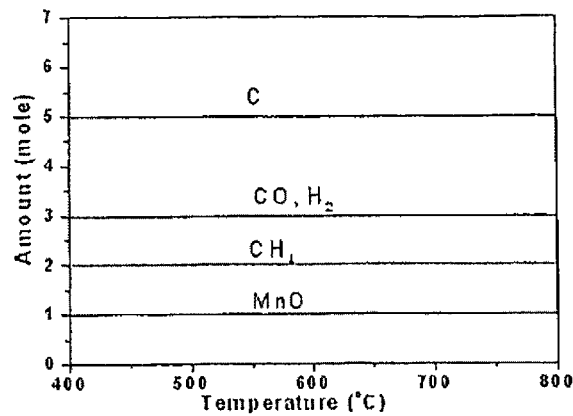
Figure: 7
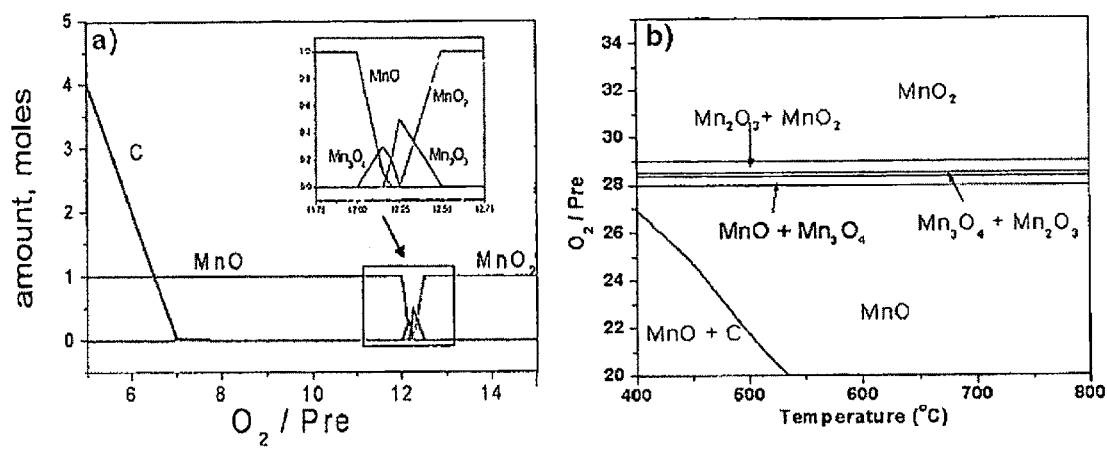
Figure: 8

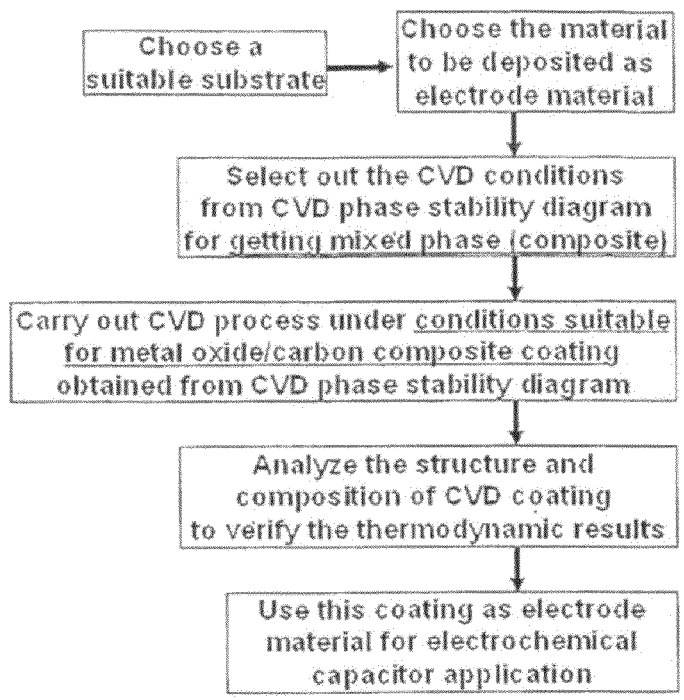
Figure: 9
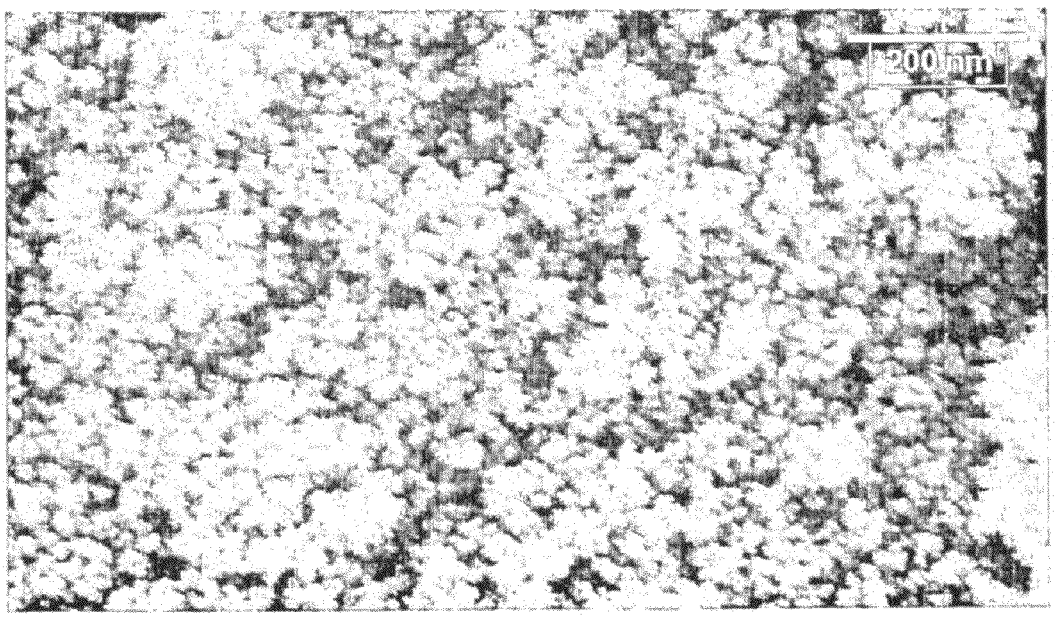
Figure: 10

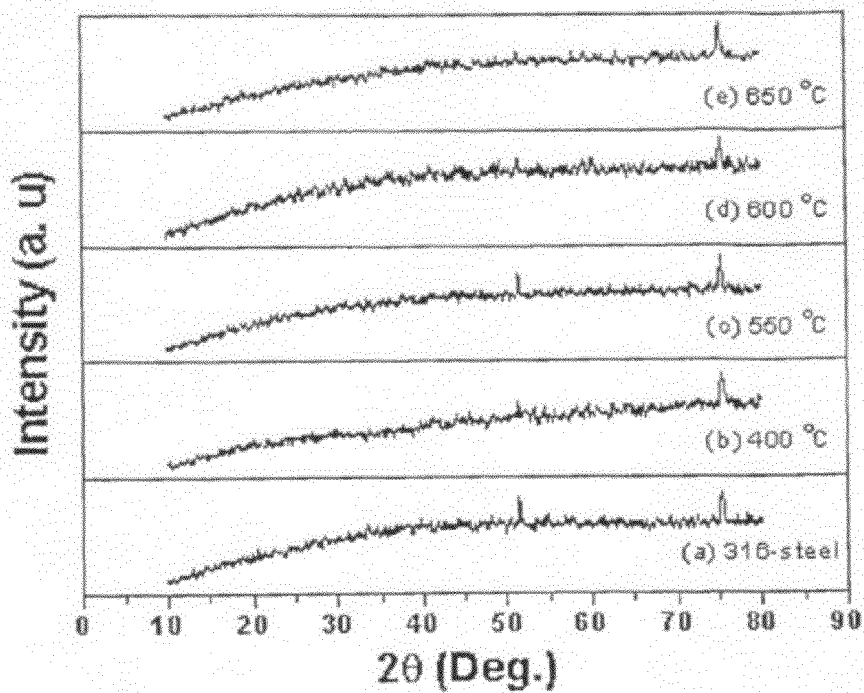
Figure: 11
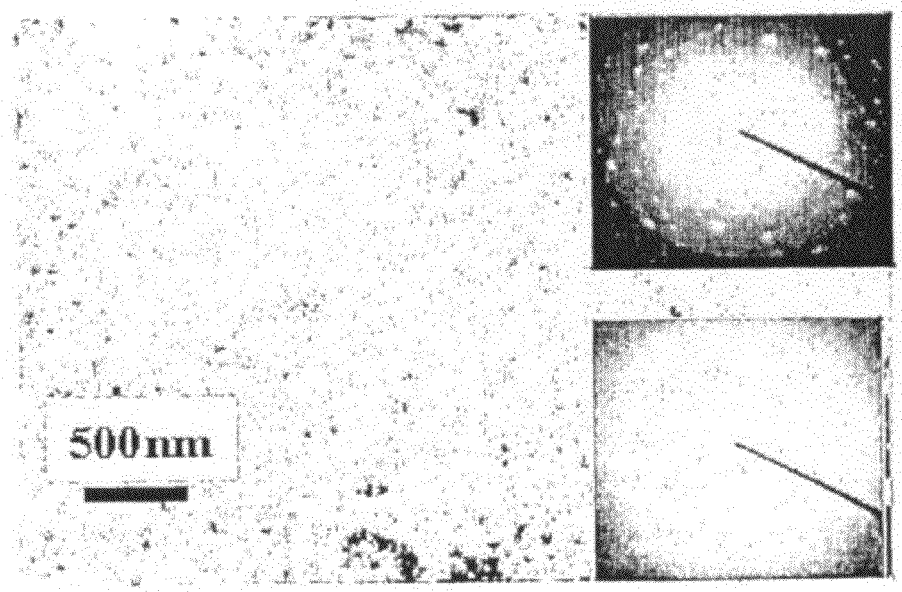
Figure: 12

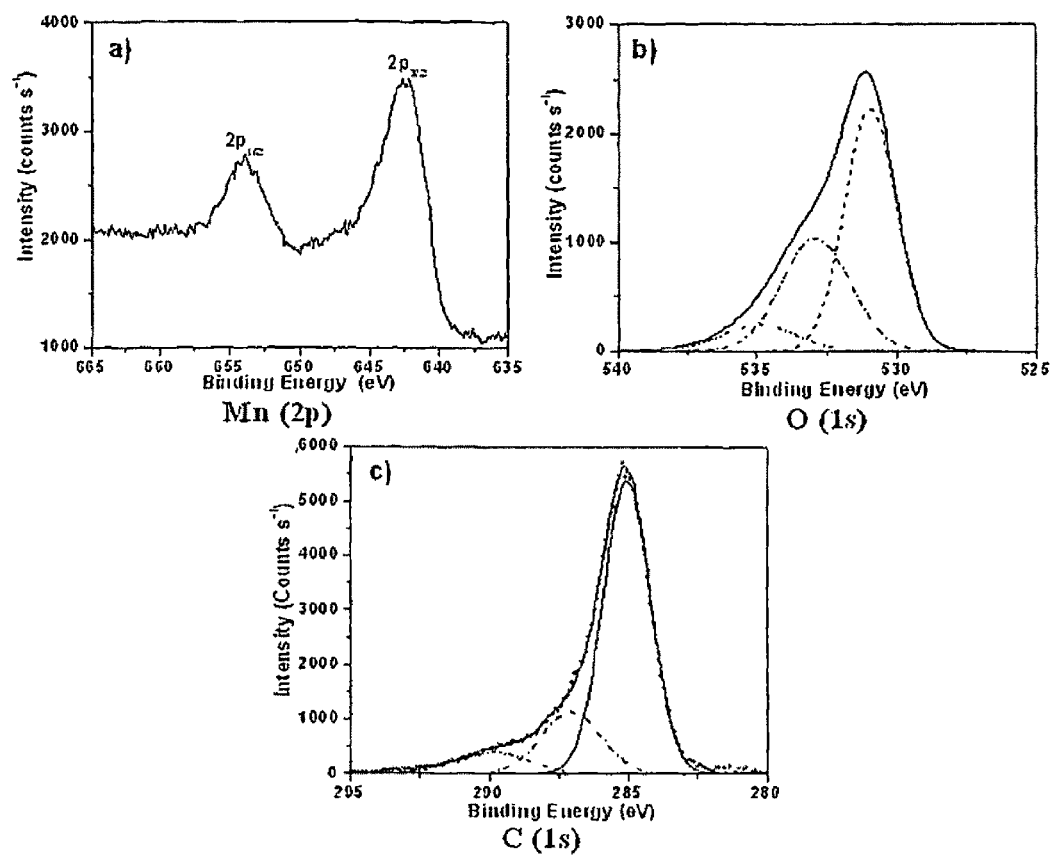
Figure: 13

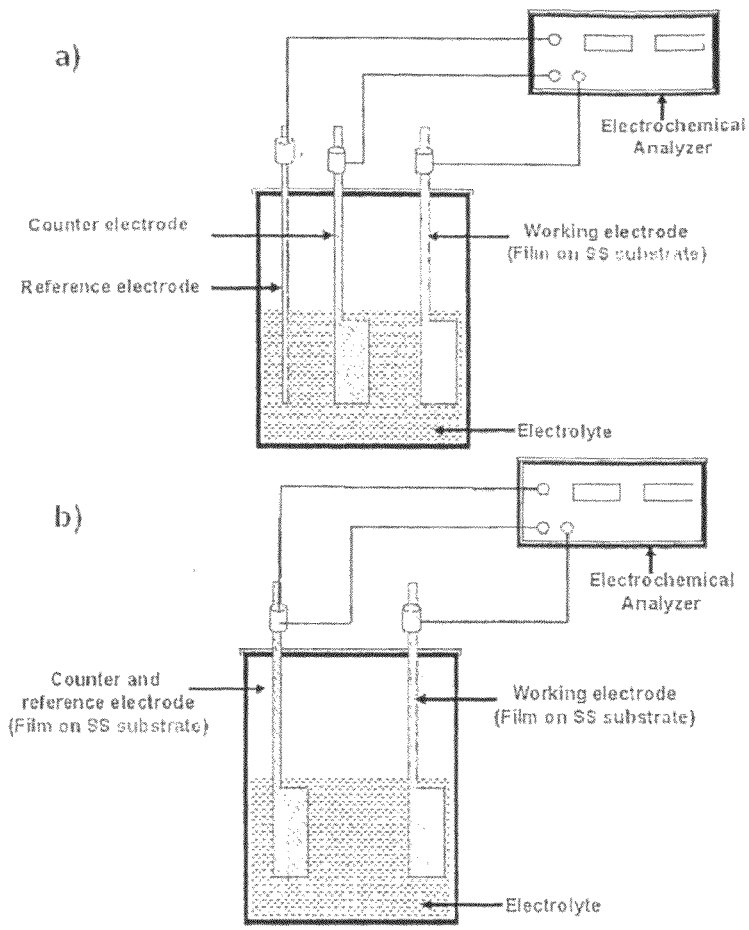
Figure: 14
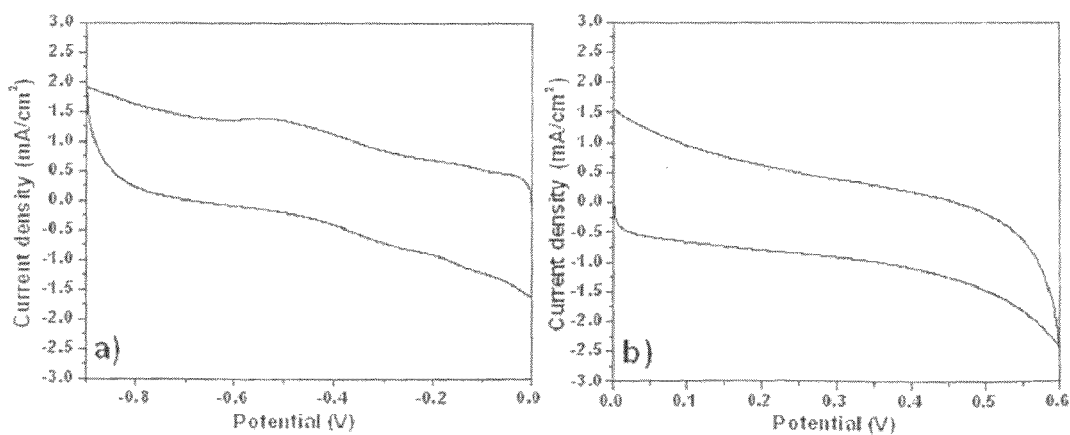
Figure: 15

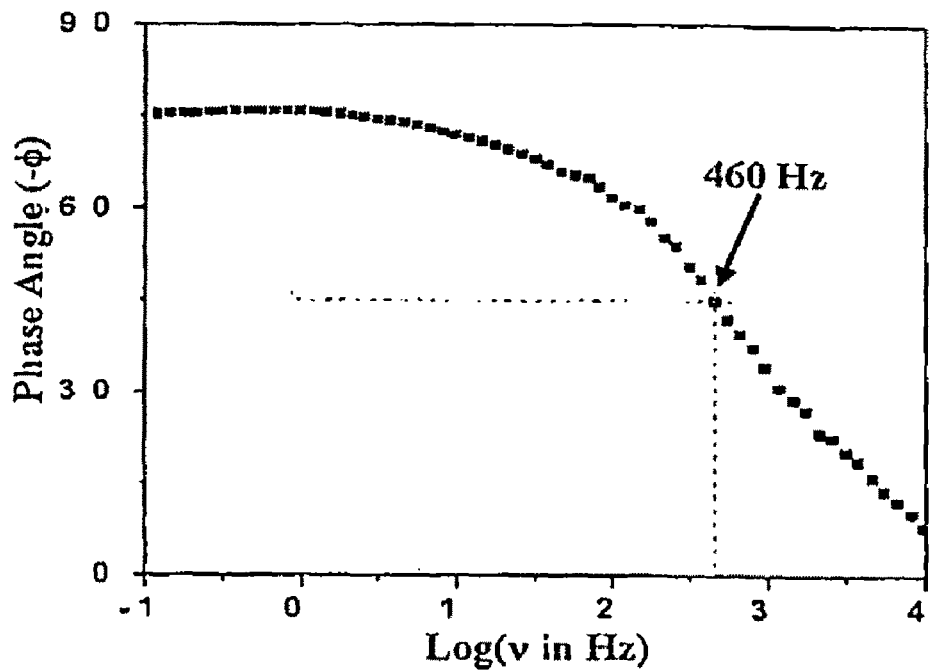
Figure: 16
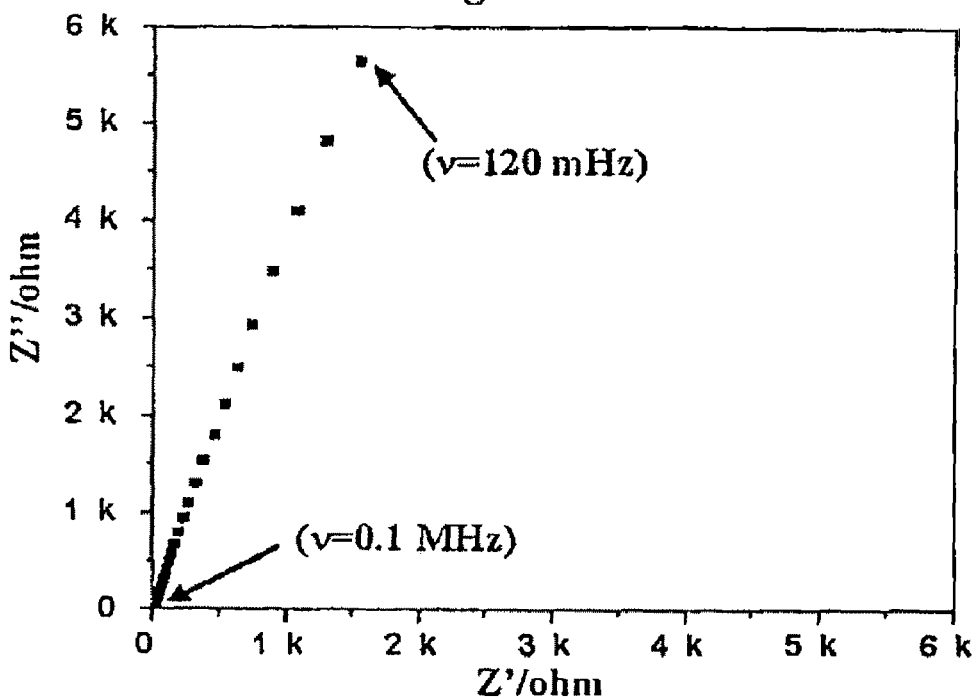
Figure: 17

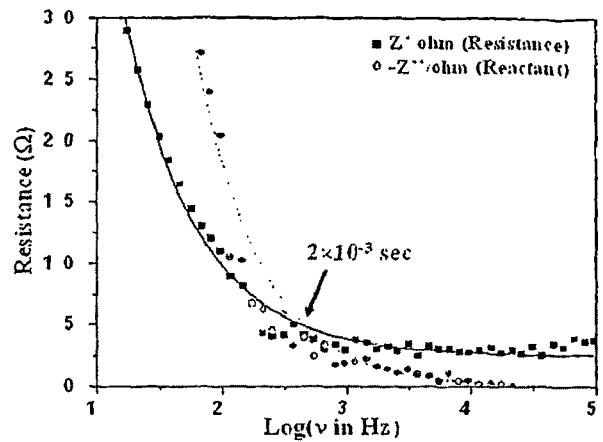
Figure: 18
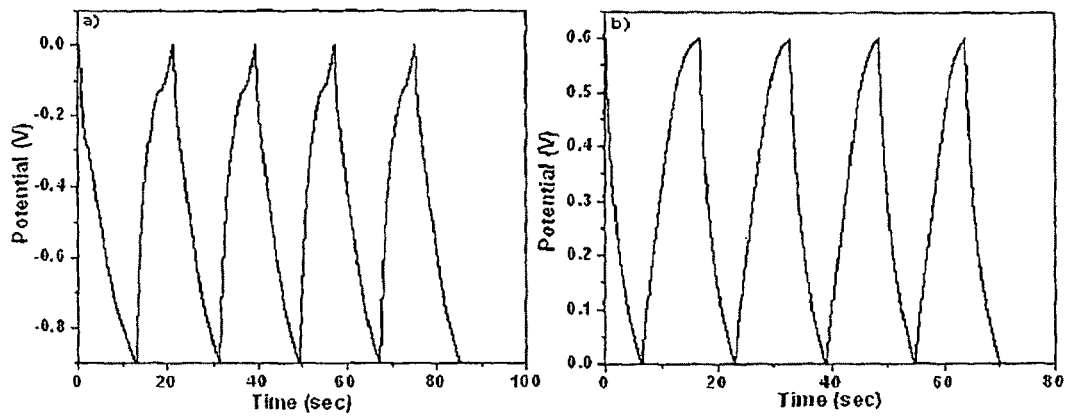
Figure: 19
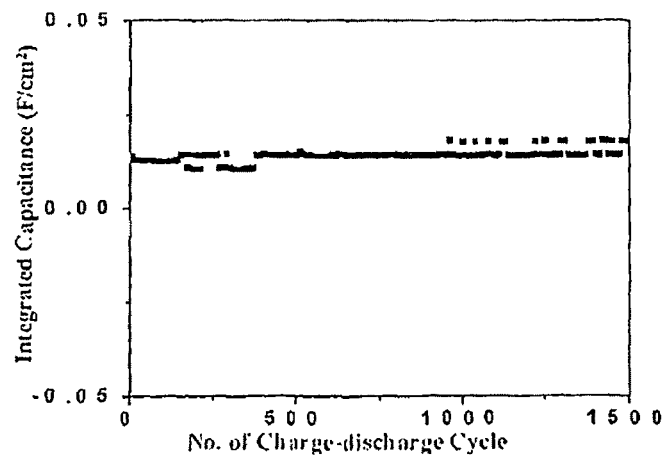
Figure: 20

COMPOSITION OF ELECTRODE MATERIAL IN THE FORM OF A COATING AND A PROCESS THEREOF

FIELD OF THE INVENTION

The present, invention is in relation to an electrochemical supercapacitor described only in a generic form; it should be understood by those skilled in the art that various changes may be made and equivalents may be substituted without departing from the true spirit and scope of the invention as defined by the appended claims. In addition, many modifications may be made to adapt a particular situation, material, composition of matter, method, process step or steps, to the objective, spirit and scope of the present invention. All such modifications are intended to be within the scope of the claims appended hereto. In particular, while the methods disclosed herein have been described with reference to particular steps performed in a particular order, it will be understood that these steps may be combined, sub-divided, or re-ordered to form an equivalent method without departing from the teachings of the present invention. Accordingly, unless specifically indicated herein, the order and grouping of the steps is not a limitation of the present invention.

BACKGROUND OF THE INVENTION

Several publications are referred to in this application. These references describe the state of the art to which this invention pertains, and are incorporated herein through appropriate citation.

Electrochemical capacitors (ECs) are of growing interest in the field of energy storage devices due to the combination of high specific energy and specific power, in comparison with batteries and conventional capacitors. In batteries, the specific energy (usually given in units of watt-hour/kg) is high, but the specific power (usually given in units of watts/kg) is low, whereas in conventional capacitors, the specific power is high, but the specific energy is low. ECs are complementary to the pulse batteries and offer applications in high power applications, hybrid-power systems for electrical vehicles, telecommunication devices, memory backup, stand-by power systems, on-board power supply, and energy storage at the extreme conditions (e.g., in deep mines and military applications). The most important feature is that they have excellent reversibility and a much longer life cycle (~20 years) than batteries.

In particular, ECs, sometimes called ultracapacitors, or supercapacitors, are of interest in hybrid electric vehicles, where they can supplement a battery to provide bursts of power needed for rapid acceleration. The latter is the biggest technical hurdle to making battery-powered cars commercially viable. A battery would still be used for cruising, but capacitors would kick in whenever the car needs to accelerate for merging, hill climbing, passing, and emergency maneuvers. This is because ECs have high power densities, i.e., they release energy much more quickly than batteries. In electric vehicle applications, large ECs can "load-level" the power demanded of the battery system, and thereby increase battery life and extend power density to a range needed in a transport vehicle. ECs can play a similar supplementary role in automobiles projected for the future, wherein a combination of fuel cells and ECs would form a part of the power train that includes an internal combustion engine. Such a hybrid power train combines greater fuel efficiency with reduced consumption of fossil fuels. To be cost- and weight-effective compared to additional battery capacity (as an alternative), ECs must combine adequate specific energy and specific power with long cycle life, and must meet the target of low cost as well.

Electrochemical capacitors are gaining acceptance in the electronics industry as system designers become familiar with their attributes and benefits. Compared to conventional capacitors, ECs have very high capacitance values, a relatively limited frequency response, and a relatively high equivalent series resistance (ESR), which is determined by electrode-electrolyte interface, electrode thickness, adhesion properties of the electrode, and the cross sectional area of the electrode. ECs were originally developed to provide large bursts of driving energy for lasers in satellites. In complementary metal oxide semiconductor (CMOS) memory backup applications, for instance, a one-Farad EC having a volume of only one-half cubic inch can replace nickel-cadmium or lithium batteries and provide backup power for months.

Conventional capacitors store energy in the electric field between two oppositely charged, conducting parallel plates, which are separated by an insulator. The amount of energy a capacitor can store increases as the area of conducting plates increases, the distance between the plates decreases, and the dielectric constant (the ability to store charge between the plates) of the insulating material increases.

Conventional electrochemical energy storage is achieved in a galvanic cell or a battery of such cells. The energy corresponds to the charge associated with chemical redox changes that can occur in the battery on discharge, multiplied by the voltage difference between the electrodes of the cell. The discharge process involves a net chemical reaction in the cell associated with passage of a certain number of electrons per formula unit, or faradays per mole of reactants.

ECs do not approach batteries in the energy density. For a given applied voltage, capacitatively storage energy associated with a given charge is about half that storable in a corresponding battery system for passage of the same charge. This difference is due to the fact that, in an ideal battery reaction, involving two-phase systems, charge can be accumulated at constant potential while, for a capacitor, charge must be passed into the capacitor where voltage and charge are being continuously built up. This is why energy storage by a capacitor is about half that for the same charge and voltage in battery energy storage under otherwise identical and ideal conditions. This makes ECs energy storage mechanism reversible, as change in energy is continuous, making the work done reversible (from a thermodynamic point of view), and there is no involvement of phase separation.

Despite their energy density being lower than that of batteries, ECs are extremely attractive power sources. Compared to batteries, they require no maintenance, offer much higher cycle-life (due to the reversibility referred to above), require a very simple charging circuit, experience no "memory effect", and are generally much safer. Physical rather than chemical energy storage is the key reason for their, safe operation and extraordinarily high cycle-life.

Interest in automotive starting, lighting and ignition (SLI) applications, as well as in electric vehicle (EV) load-leveling, has stimulated product development activities for such high-power devices. The goal is to develop devices that can be efficiently charged and then discharged within the short duration specified for these high-power applications.

Severe demands are placed on the energy storage system used in an EV. The system must store sufficient energy to provide an acceptable driving range. It must have adequate power to provide acceptable driving performance, notably acceleration rate. In addition, the system must be durable to give years of reliable operation. And finally, the system must be affordable. These four requirements are often in conflict for candidate energy storage technologies. This situation creates significant challenges to developers of EV energy storage systems.

A capacitor offers significant advantages to the EV energy storage system. But, to be useful, it must store about 400 Wh of energy, be able to deliver about 40 kW of power for a short duration, provide high cycle-life ($\geq$100,000 cycles), and meet specified volume, weight, and cost constraints.

The present invention is the result of an effort to address these requirements, and concerns developments in the direction of fulfilling some of them.

The energy stored in a charged capacitor can be continuously increased in proportion to the increase of the voltage, limited only by electrical breakdown of the dielectric. The maximum available stored energy, for a given chemical species, is determined by the quantity of electrochemically active materials, their standard electrode potentials, and their equivalent weights, while the maximum power is limited by the reversibility of the electrochemical changes that take place over discharge, together with the electrical resistivity of the materials and external circuitry.

Electrochemical capacitors are classified on the basis of different mechanisms, namely the double layer mechanism and the pseudo-capacitance mechanism. The double layer capacitance mechanism arises from the separation of the charge at the interface between a solid electrode and an electrolyte, and chemisorption and desorption of the electrolyte takes place over an appropriate potential range. The charge storage process is non-Faradaic, i.e., ideally, no electron transfer takes place across the electrode interface [1-4]. The electric double-layer capacitance of a metal electrode is in the order of a few tens of $\mu F/cm^2$, and to make use of the electric double-layer capacitors in applications requiring large capacitance, one must consider high surface area electrode materials. Activated carbon electrode-based capacitors are based on double layer capacitance mechanism, where high capacitance depends on large surface area, stated usually in $m^2$ of surface area of the electrode per gram of the electrode material [5-9]. Although the energy storage capability of the double layer was recognized more than 100 years ago, it took the development of low-current-draw volatile computer memories to create a market for ECs.

The Helmholtz double layer plays a key role in the working of the EC. It forms near the electrode/electrolyte interface. When an electrode has excess charge, charge separation takes place in the electrolyte with the formation of a double layer as shown in FIG. 1. This idea is similar to that of an electrolytic capacitor, where charge separation takes place only by pure electrostatic force. The outer layer is formed by the first layer of non-specifically adsorbed ions. These ions are completely surrounded by the solvation shell. The thickness of the outer layer is the distance from the centre of non-specifically adsorbed ion and the electrode. These ions are held in place by purely electrostatic forces and give electrostatic contribution to the capacitance. The inner layer is formed by specifically adsorbed ions, which are ions with a weakly bounded solvation shell. These ions may lose some part of the solvation shell to form a chemical bond with the electrode surface. The chemical interaction between specifically adsorbed ions and the electrode surface causes more charge to be accumulated at the surface than required by electrostatics, giving rise to a very large capacitance [1,10].

The high volumetric capacitance density of an EC (10 to 100 times greater than conventional capacitors) derives from using porous electrodes to create a large effective "plate area" and from storing energy in the diffuse double layer. This double layer, created naturally at an electrode-electrolyte interface when voltage is imposed, has a thickness of only about 1 mm, thus forming an extremely small effective "plate separation", (and thus high capacitance).

The performance characteristics of electrochemical capacitors are fundamentally determined by the structural and electrochemical properties of electrodes. Various materials, including doped conducting polymers, metal oxides, metal nitrides, and carbon in various forms, have been studied for use as electrode materials.

Several methods are known in the art for increasing the amount of energy stored in an electrochemical capacitor. One such method is to increase the surface area of the active electrode. High surface area electrodes result in an increase in capacitance and thus increased stored energy. Another approach to increasing stored energy involves using different types of material for fabricating the capacitor electrodes. Carbon electrodes are used in most commercial capacitors, while precious metal oxide electrodes are used in the capacitors known as pseudocapacitors.

The pseudocapacitance mechanism arises indirectly from fast reversible interfacial pseudo-faradaic redox reactions in which chemisorption of ions or molecules takes place with partial charge transfer over an appropriate potential range i.e., the electrode material partially gets oxidized or reduced [1,11,12]. Pseudocapacitance can add significantly to enhancing the capacitance—and hence energy density—of the supercapacitor device.

An electrochemical capacitor involving pseudo-faradaic reactions will have a cyclic voltammogram different from that of a pure double-layer capacitor, the pseudocapacitance revealing a Faradaic signature. Doublelayer capacitors are commonly of the order of a few tens of $\mu F\ cm^{-2}$, while pseudocapacitors associated with EC systems are commonly of the order of hundreds of $\mu F\ cm^{-2}$ [1,11,12].

There are generally two kinds of pseudocapacitor electrode materials: conducting metal oxides, (i.e., $RuO_x$, $IrO_x$, and $CrO_x$, x~2.0) and redox conductive polymers (i.e., polyaniline, polypyrrole, and polythiophene). Pseudocapacitors fabricated to date with these electrode materials generally suffer from high material cost and low cell voltage. Supercapacitors with metal oxide electrodes commercially available today are expensive, as many of the preferred metals, such as Ru and Ir, are expensive. Supercapacitors with redox polymer electrodes generally have a relatively high energy storage capacity and low cost. However, these conductive polymers have a narrow working voltage in proton-conducting electrolytes and suffer from limited cycle life (degradation).

Supercapacitors with electrodes comprising hydrated ruthenium oxide, $RuO_2.nH_2O$, for have been shown to provide high capacitance because of the pseudocapacitance mechanism [13]. The amorphous nature of the hydrated oxide and the interaction between the proton of the hydroxyl group in the electrode and the electrolyte, together lead to fast proton diffusion rates which is responsible for high capacitance in hydrated ruthenium oxide. But high cost and limited cycle life are continuing impediments to the commercial use of such materials. Therefore, efforts have been made recently to prepare electrode materials containing a composite of metal oxides to reduce cost, to provide firm support for conduction, as well as to enhance the surface area.

Because of the redox reactions involved in the pseudocapacitance mechanism, the cyclic voltammogram for the pseudocapacitance mechanism-based capacitors may not be perfectly rectangular in shape. So, the durability of the capacitor based on pseudocapacitance mechanism will be limited in comparison to the capacitor based on the pure double-layer mechanism. Nevertheless, the working life of capacitors will be longer than that of batteries, wherein a distinguishable phase transition is observed in the cyclic voltammogram. On the other hand, using known or proposed electrode materials, the specific goals of obtaining high power output suitable for electric vehicle (EV) applications cannot be met by a pure double-layer capacitor. Carbon-based electrodes give slightly better capacitance in sulfuric acid, but oxidation of carbon and corrosion of the current collectors can be a problem, especially at higher voltages. This has made it necessary so far to employ expensive noble metals as the supporting conducting materials [14,15].

Because of its superior electrochemical properties, manganese dioxide ($MnO_2$) is one of the promising, alternative metal oxide electrode materials. Its natural abundance, low cost and its environmental compatibility make it a very desirable choice in any energy storage device [6,16-21]. Various groups have reported experimentally deliverable capacitance of the order of 700 F/g [22]. However, the electrical conductivity of $MnO_2$ is not as high as that of ruthenium oxide, which has the advantage of bulk conductivity throughout the electrode. Whereas the entire bulk is involved in hydrous ruthenium oxide in the pseudocapacitance mechanism, only the surface is involved in the case of manganese oxide [23]. One way to increase conductivity is to add a conducting additive such as carbon black [24-27].

The aforesaid points to the desirability of having a carbonaceous composite material, preferably a metal oxide/carbon composite, as the electrode material for supercapacitor. Furthermore, a composite material containing oxide nanoparticles in a carbonaceous matrix might help overcome the disadvantage noted above, viz., only the surface layers of the oxide ($MnO_2$) is involved in the pseudo capacitance mechanism.

PRIOR ART OF THE INVENTION

The related art of interest describes various processes for obtaining Electrochemical capacitors containing electrodes fabricated from more than one material (multi-component electrode materials), but none discloses the present invention. The related art will be discussed in the order of perceived relevance to the present invention.

U.S. Pat. Nos. 6,205,016 and 6,491,789, and pending US Patent Application No. 20020008956, all in the name of Niu and Chun-Ming, describe the various multi-component electrode materials known in the prior art, which are quoted below.

U.S. Pat. No. 4,862,328 (Morimoto et al.) describes a polarizable electrode for a coin-shaped double layer capacitor composed of a structure of fluorine-containing polymer resin with a fine carbon powder incorporated therein. The structure includes fine nodes of resin connected by fine fibers of the resin. The carbon powder is contained in the nodes. The fluorine-containing polymer resin is about 5 to 30% by weight relative to the fine carbon powder. A sealing material is interposed in the capacitor.

U.S. Pat. No. 5,079,674 (Malaspina) provides for an electrode used in supercapacitors composed of two active electrodes bonded to opposite sides of a dielectric separator. The active electrodes consist of metal oxides, chlorides, bromides, sulfates, nitrates, sulfides, hydrides, nitrides, phosphides, or selenides coated onto porous carbon particles. The coated particles are bound together in a matrix of a fluorocarbon resin.

U.S. Pat. No. 5,136,473 (Tsuchiya et al.) relates to an electric double layer capacitor having at least two polarized electrodes, a separator interposed between the electrodes, and a casing in which the electrodes, separator, and electrolyte are accommodated. The polarized electrodes are composed of two powders of joined, minute, active carbon particles, which have different diameters.

U.S. Pat. No. 5,369,546 (Saito et al.), the electric double layer capacitor is described, in which composite materials of activated carbon/polyacene comprise conductive layers formed on electrical insulating ceramic substrates; a pair of these polarizable electrodes are arranged to be facing each other through a separator, forming a capacitor.

U.S. Pat. No. 5,501,922 (Li et al.) relates to a modified carbon electrode for use in an energy storage device made from an activated carbon support having adsorbed thereon a protonated polymer, the polymer having adsorbed therein a poly-oxometallate.

U.S. Pat. No. 5,429,893 granted to Thomas describes an electrochemical capacitor comprising a first electrode fabricated of a carbon-based material, a second electrode fabricated of an inorganic redox material such as Ru, Rh, Pd, Os, Ir, Co, Ni, Mn, Fe, Pt, and alloys and oxides thereof, and an electrolyte disposed between the first and second electrodes.

U.S. Pat. No. 5,538,813 granted to Li covers an electrochemical storage device fabricated from two opposing asymmetric electrode assemblies and a solid polymer electrolyte. The first electrode consists of a conducting polymer selected from polyaniline, polypyrrole, polythiophene, polychlorophenylthiophene, polyfluorophenolthiophene and n or p-doped conducting polymer. The second electrode is fabricated from Al, Fe, In, Mn, Mg, Sb, Mo, Cr, Ni, N, V, An, Ru, Ir, Co, Zn, Sn, Bi, Cd, Pd, Ag, or alloys or oxides thereof. A polymer electrolyte is dispersed between the electrodes.

U.S. Pat. No. 5,557,497 (Ivanov et al.) relates to a capacitor comprising an electrolyte, at least one pair of electrolyte-impregnated electrodes, a separator, at least one pair of current collectors, and an uncompressed gasket. The electrolyte-impregnated electrodes are composed of various forms of carbon particles in combination with porous elastic dielectrics and polymer binders.

U.S. Pat. No. 5,581,438 granted to Halliop describes a double-layer capacitor having a housing, a porous separator, an electrolyte, a conductor and electrodes. The electrodes are formed from a current collector positioned against a non-woven web of non-activated carbon fibers impregnated with carbon particles and positioned on either side of a porous layer within a container including a suitable electrolyte.

In order to achieve improved power performance over earlier capacitor devices, the NEC Company, Japan, developed an activated carbon/carbon composite electrode with a sulfuric acid electrolyte to be used in a supercapacitor. The electrodes are formed from phenol resin, activated carbon powder and PMMA. The phenol resin was used as a binder.

Merryman et al. of Auburn University have also designed a two-component electrode. The double layer capacitors are constructed using a composite-carbon/metal electrode structure. Large surface area carbon fibers are blended with nickel fibers and a cellulose binder. This mixture is then converted to a paper sheet. A thin foil backing plate is sandwiched between two pieces of the composite paper material. With the nickel fibers sinter-bonded to each other, a conducting path which does not require pressure to achieve low ESR values, is formed throughout the carbon bed."

The foregoing lists some of the patents describing the relevant prior art in the field of electrode materials for supercapacitors.

The two-component electrodes described in these patents and references provide improved electric capacity and/or mechanical properties to the electrochemical capacitor, compared to electrodes described in earlier art. However, many of these electrodes (described in the prior art listed above) require the presence of a binder or sealer material (in addition to the electrically conductive materials) to hold the electrode components in the desired shape or in the proper orientation. Further, they are not able to provide sufficient electrical capacitance to be used in many high-energy and high-power applications, and work only with certain electrolytes. Moreover, many of the references describe asymmetric two-component electrodes in which the two components are not combined but are present in different electrodes.

Accordingly, there exists the need to provide novel electrochemical capacitors exhibiting greater capacitance using composite electrodes having a large accessible surface area, high porosity, and few micropores (or none), and being free of the limitations inherent in prior-art systems. There also exists the need to provide for a method of producing uniform, symmetrical electrodes which can be used in capacitors to achieve higher operating voltage levels as well as sealing of the completed electrode. Such electrochemical capacitors must have high electrical conductivity, provide high power and high energy, and must be fabricated from environmentally benign materials. In addition to high electrical conductivity, it is important that the composite electrodes exhibit high utilization efficiency of expensive active materials, and have high structural as well as chemical stability. Moreover, fabrication of such composite electrodes should be simple, inexpensive, and readily repeatable.

Given below is a description of some of the methods of making electrode materials for supercapacitor applications.

One method of preparation of a metal oxide coating for use as electrode material is the sol-gel/wet-chemical method [22, 23,25,28-30]. Sol-gel/wet-chemical methods comprise a wide variety of procedures. In general, sol-gel/wet-chemical method is used to synthesize metal oxides through chemical treatment of the metal ion/complex in solution. After the formation of oxide, carbon may be added to obtain an oxide/carbon composite colloidal solution. This colloidal solution may be used to form a coating of the oxide/carbon composite electrode material on a substrate (using a binder), which is then dried. It must be noted, however, that such a process generally does not lead to strong adhesion of the coating to the substrate, because no interfacial interaction (bonding) occurs. This is because, in general, treatment at an elevated temperature is required for significant interfacial interactions to take place leading to improved adhesion. On the other hand, annealing of the coating/substrate structure at an elevated temperature is known generally to improve adhesion, because of enhanced interfacial (chemical) interaction. However, annealing at elevated temperature generally leads to oxide grain growth, which results in a reduced specific surface area of the electrode material. Such reduced specific surface area is detrimental to achieving a high capacitance. Alternatively, the composite electrode material may be formed through a physical mixing process. In general, physical mixing processes, such as ball-milling, require a long time to yield a metal oxide/carbon composite uniformly mixed at the nanometer-level. Such a mixture would then have to be made into slurry, employing a suitable binder, in order to obtain a composite coating on the desired substrate. However, this process does not provide proper thickness control. The starting material may not be used efficiently and the adherence to the substrate is likely to be poor because, in the absence of any annealing treatment at an elevated temperature, the film is not likely to be chemically bound to the substrate. Annealing at elevated temperature, required to improve adhesion to the substrate would, as already noted, lead to grain growth, with results detrimental to achieving high capacitance.

Another method, i.e., an electrochemical method, has been used to prepare thin films of metals and metal oxides [31-34]. The mass and thickness of the metal-oxide film in the electrochemical method may be easily controlled by adjusting the current, bath chemistry, and temperature [35]. However, there appears to be no reported electrochemical method that produces a composite film/coating that contains both a metal oxide and carbon.

Yet another method of making coatings, which may be applied to the fabrication of coatings that serve as supercapacitor electrodes, is chemical vapour deposition (CVD). In particular, metalorganic chemical vapour deposition (MOCVD) is a suitable process for the preparation of thin films and coatings of metal oxides, because of the metal-oxygen chemical bond present in the metalorganic precursor(s) used in such a process. The method in general provides uniformity in thickness and composition over large substrate area and also conformal coverage with great reproducibility, so that substrates of arbitrary shapes may be used. Because of the elevated temperatures generally required in the MOCVD process, the adhesion of the film (coating) to the substrate can be strong, resulting from the chemical bonding that occurs at the film/substrate interface. Ina thin film electrode, such improved adhesion can lead to greater durability (cyclability) of the electrode.

The development of a MOCVD process has usually been an ad hoc effort, especially where new CVD precursors are being employed. It would therefore be desirable to model the chemical aspects of the process so that its development becomes less ad hoc and to obtain insight into the deposition mechanism. This can be achieved by thermodynamic modeling of the MOCVD process. For a given chemical system, it provides valuable information on the composition of the resulting gaseous and condensed phases at equilibrium as a function of the process parameters. Thus, it is possible to form "CVD phase stability diagrams" corresponding to different CVD precursors to depict the stability windows for different pure and mixed condensed phases as functions of the process parameters [36]. In this manner, the thermodynamic analysis can guide the choice of MOCVD precursors and the experimental conditions to deposit films of particular compositions. Though there may be some quantitative uncertainty in the predictions made by such analysis, it is usually accurate enough to guide MOCVD process development, and has been found helpful in the MOCVD of GaAs [37], and several other systems [36,38,39].

In the thermodynamic equilibrium calculations, it is assumed that the substrate and the film being deposited on it are in equilibrium with the vapor phase. As all practically useful CVD processes are conducted in the mass-flow-limited regime, the assumption that quasi-equilibrium conditions prevail is justified, and validates thermodynamic calculations [36]. The method involves a search for a minimum value of the Gibbs free energy G of the system, subject to the mass balance relations as subsidiary conditions [40]. These phase stability diagrams obtained by this method represent graphically the regions of CVD parameter space (temperature, reactor pressure, relative concentration of reactants) in which a given (solid) substance is to be expected as a reaction product or deposit (coating). It may specifically be noted that the acronyms CVD and MOCVD are used interchangeably in what follows, without limiting the meaning of constructions such as the "CVD phase stability diagram".

OBJECT OF THE PRESENT INVENTION

The principal object of the present invention is to obtain a composition of electrode material in the form of a coating represented by formula $Mn_{1-x}O/C$.

Another object of the present invention is to develop a process for deposition of composition represented by formula $Mn_{1-x}O/C$.

Yet another object of the present invention is to develop a capacitor having electrode coated with a composition represented by formula $Mn_{1-x}O/C$, wherein x is $\geq 0$ and $\leq 0.1$ and C is carbon.

Still another object of the present invention is to develop an electrode coated with composition represented by formula $Mn_{1-x}O/C$, wherein x is $\geq 0$ and $\leq 0.1$ and C is carbon.

A further object of the present invention is to obtain the coating of the composition on a substrate in the form of a nanocomposite layer.

An additional object of the present invention is to make the coating of the composition into electrodes of an electrochemical capacitor for application in the fields of automobiles, aerospace engineering, very large scale integrated circuits (VLSI) technology, micro-electro-mechanical systems (MEMS), and wherever compact, high-power density energy storage systems are desirable.

STATEMENT OF INVENTION

Accordingly, the present invention provides a composition of electrode material in the form of a coating, said composition represented by the formula $Mn_{1-x}O/C$, wherein $Mn_{1-x}O$ is the monoxide of manganese with x is $\geq 0$ and $\leq 0.1$ and C is carbon; a process for deposition of the electrode material of composition represented by the formula $Mn_{1-x}O/C$, wherein x is $\geq 0$ and $\leq 0.1$ and C is carbon, as a nanocomposite coating on the substrate to form a nanocomposite coated electrode configuration, said process comprising steps of: volatilizing the precursor containing manganese and carbon in a vaporizer to obtain the vapors of the precursor; contacting the substrate with the precursor vapors under chemical vapor deposition (CVD) conditions; and adsorption followed by decomposition of precursor molecules on substrate surface to form the nanocomposite coated electrode; a capacitor having electrode coated with a composition represented by formula $Mn_{1-x}O/C$, wherein x is $\geq 0$ and $\leq 0.1$ and C is carbon; an electrode coated with composition represented by formula $Mn_{1-x}O/C$, wherein x is $\geq 0$ and $\leq 0.1$ and C is carbon; and a method of coating electrode composition represented by formula $Mn_{1-x}O/C$, wherein x is $\geq 0$ and $\leq 0.1$ and C is carbon, as a nanocomposite coating on the electrode of an electrochemical capacitor in the fields of automobile, aerospace engineering and applications, very large scale integrated circuits (VLSI) technology, micro-electro-mechanical systems (MEMS), and combinations thereof.

BRIEF DESCRIPTION OF THE ACCOMPANYING DRAWINGS

FIG. 1. Sketch diagram of double layer model (Adapted from D. M. Kolb, Surface Science 500 (2002)] 722 [10])

Figure 2:
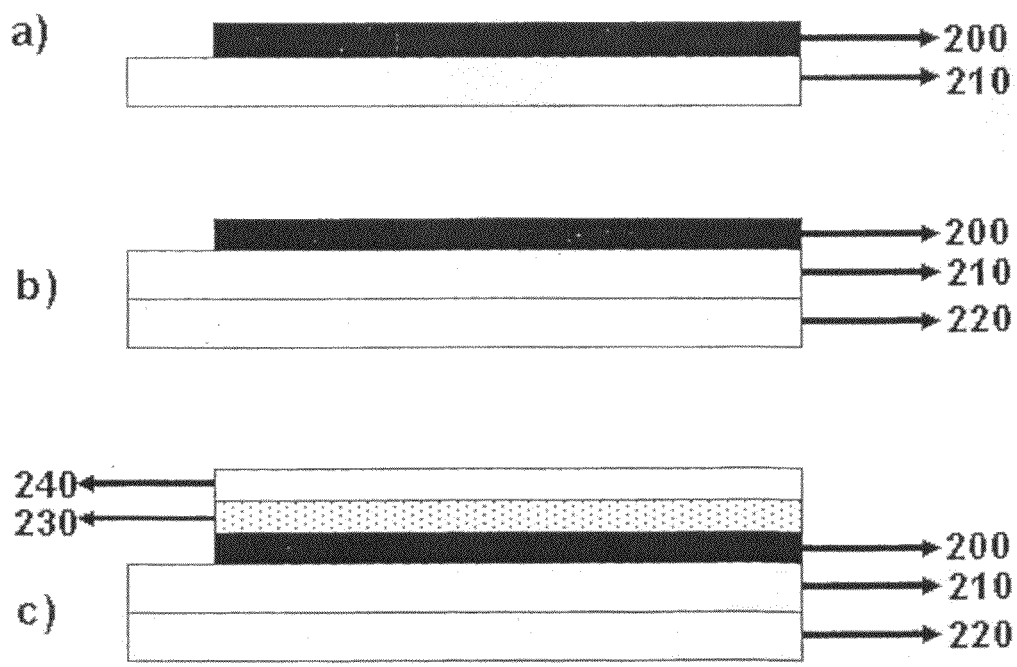

FIG. 2. Schematic diagram of the $Mn_{1-x}O/C$ nanocomposite film/coating sandwiched between the substrate deposited by MOCVD process.

Figure 3:
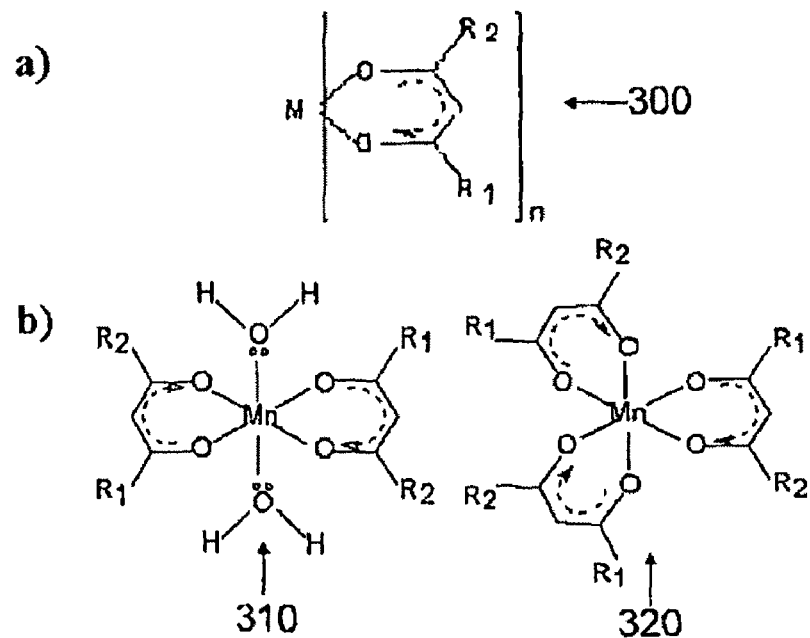

FIG. 3. (a) General molecular structure of the β-diketonate complex of M in general. (b) Molecular structures of diaquobisacetylacetonatomanganese(II), and trisacetylacetonatomanganese(III) represented respectively as $[Mn(acac)_2(H_2O)_2]$, 310, and $[Mn(acac)_3]$, 320, when $R_1=R_2=CH_3$.

Figure 4:
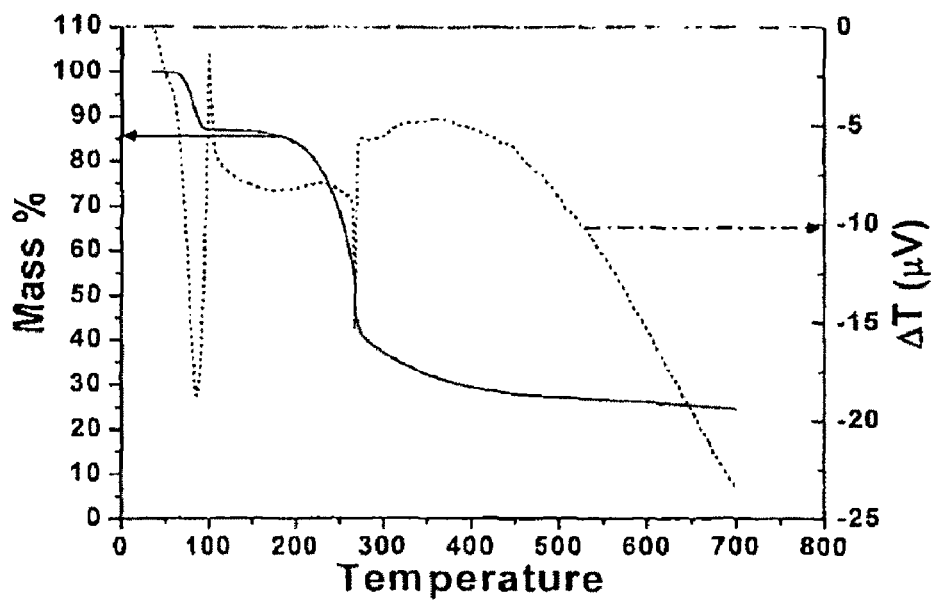

FIG. 4. TG/DTA of $Mn(acac)_2(H_2O)_2$ carried out in nitrogen ambient.

FIG. 5. Mass spectrum of $Mn(acac)_2(H_2O)_2$.

FIG. 6. Flow chart adopted for the thermodynamic modeling of the CVD process.

FIG. 7. Variation in the equilibrium molar concentration of various reaction products from $Mn(acac)_2(H_2O)_2$ in argon atmosphere as a function of temperature.

FIG. 8. (a) Variations in the calculated equilibrium molar concentrations of various condensed phases formed from $Mn(acac)_2(H_2O)_2$, as a function of $O_2$/Pre.

(b) "CVD phase stability diagram" to represent the formation of MOCVD-grown solid phases from $Mn(acac)_2(H_2O)_2$.

FIG. 9. Flow chart used for the making of a general electrode material of the present invention prepared by MOCVD.

FIG. 10. Field emission SEM of Mn-oxide/C nanocomposite film/coating grown on SS316 by MOCVD.

FIG. 11. XRD pattern of Mn-oxide/C nanocomposite layer/coating grown as a function of deposition temperature on SS-316 by MOCVD using $Mn(acac)_2(H_2O)_2$.

FIG. 12. TEM of the $Mn_{1-x}O/C$ film/coating grown on the SS-316 by MOCVD.

FIG. 13. XPS of the $Mn_{1-x}O/C$ nanocomposite film/coating deposited on SS-316 by MOCVD.

FIG. 14. Block diagram of electrochemical a) β-electrode cell configuration b) 2-electrode cell configuration for electrochemical capacitance measurements FIG. 15. CV in the (a) negative potential and (b) positive potential range, respectively, of the $Mn_{1-x}O/C$ nanocomposite film/coating deposited on SS-316 by MOCVD.

FIG. 16. Impedance (Bode) plot of $Mn_{1-x}O/C$ nanocomposite layer/coating deposited on SS-316 by MOCVD.

FIG. 17. Impedance (Nyquist) plot $Mn_{1-x}O/C$ nanocomposite layer/coating deposited on SS-316 by MOCVD.

FIG. 18. Time constant for the $Mn_{1-x}O/C$ nanocomposite layer/coating deposited on SS-316 by MOCVD.

FIG. 19. Chronopotentiometry in (a) negative potential range and (b) positive potential range respectively of $Mn_{1-x}O/C$ nanocomposite film/coating deposited on SS-316 by MOCVD.

FIG. 20. Capacitance vs. number of charge-discharge cycles for the $Mn_{1-x}O/C$ nanocomposite film/coating deposited on SS-316 by MOCVD.

DETAILED DESCRIPTION OF THE PRESENT INVENTION

The present invention is in relation to a composition of electrode material in the form of a coating, said composition represented by the formula $Mn_{1-x}O/C$, wherein $Mn_{1-x}O/C$ is the monoxide of manganese with x is $\geq 0$ and $\leq 0.1$ and C is carbon.

In another embodiment of the present invention, wherein the formula $Mn_{1-x}O/C$ means a material in which both the oxide, $Mn_{1-x}O$, and the element, C, are present.

In yet another embodiment of the present invention, wherein said manganese oxide particles are either amorphous or crystalline and the carbon particles are amorphous.

In still another embodiment of the present invention, wherein said composition is homogeneous and has a particle size ranging from 2 nm to 100 nm.

In still another embodiment of the present invention, wherein said composition is homogeneous and has a particle size preferably of about 5-25 nm.

In still another embodiment of the present invention, wherein the molar ratio of elemental carbon to $Mn_{1-x}O$ ranges from 99:1 to 1:99.

In still another embodiment of the present invention, wherein the coating method is selected from a group comprising chemical vapor deposition, atomic layer deposition, spin coating, dip coating and combinations thereof.

In still another embodiment of the present invention, wherein the composition is coated over substrates which are electrically conducting, selected from, but not limited to, a group comprising nickel, platinum, gold, stainless steel or a thin sheet of stainless steel, which may be folded into a compact shape or a thin film of platinum or gold and any other metal or metal alloy or any metal or metal alloy coated onto a silicon or other semiconductor.

In still another embodiment of the present invention, wherein said manganese precursor compound is selected from a group comprising organometallic compounds of manganese, such as manganocene, β-diketones of manganese, such as diaquobisacetylacetonatomanganese (II) and trisacetylacetonatomanganese (III) and derivative compounds thereof which contain direct manganese oxygen bonds with hydrocarbon or other organic moieties.

The present invention is in relation to a process for deposition of the electrode material of composition represented by the formula $Mn_{1-x}O/C$, wherein x is $\geq 0$ and $\leq 0.1$ and C is carbon, as a nanocomposite coating on the substrate to form a nanocomposite coated electrode configuration, said process comprising steps of:
(a) volatilizing the precursor containing manganese and carbon in a vaporizer to obtain the vapors of the precursor;
(b) contacting the substrate with the precursor vapors under chemical vapor deposition (CVD) conditions; and
(c) adsorption followed by decomposition of precursor molecules on substrate surface to form the nanocomposite coated electrode.

In another embodiment of the present invention, wherein said manganese precursor compound is selected from a group comprising organometallic compounds of manganese, such as manganocene, β-diketones of manganese, such as diaquobisacetylacetonatomanganese (II) and trisacetylacetonatomanganese (III) and derivative compounds thereof which contain direct manganese oxygen bonds with hydrocarbon or other organic moieties.

In still another embodiment of the present invention, wherein said precursor vapors are transported into a reaction chamber using a chemically inert gas selected from a group comprising but not limited to argon, nitrogen, neon, krypton, and xenon.

In still another embodiment of the present invention, wherein in addition to the inert carrier gas, the flow of an oxidizing gas, such as oxygen, ozone ($O_3$), nitrous oxide ($N_2O$), or a combination thereof is employed or a combination of gases, such as hydrogen ($H_2$) and carbon dioxide ($CO_2$), which yields oxygen concentration.

In still another embodiment of the present invention, wherein the composition is coated over substrates which are electrically conducting, selected from, but not limited to, a group comprising nickel, platinum, gold, stainless steel, and any other metal or metal alloy that can sustain the processing.

In still another embodiment of the present invention, wherein the composition is coated over substrate which is a thin film of platinum or gold or any metal or metal alloy deposited on a wafer of silicon or other semiconductor or a wafer of an insulator such as ceramic alumina.

In still another embodiment of the present invention, wherein the substrate is a thin sheet of stainless steel, or other metal/alloy, which may be folded into a compact shape.

In still another embodiment of the present invention, wherein the surface area of the coating on a substrate ranges from about 50 $m^2$/gram to about 3000 $m^2$/gram.

In still another embodiment of the present invention, wherein the surface area of the coating on a substrate is preferably greater than 2000 $m^2$/gram.

In still another embodiment of the present invention, wherein said chemical vapor deposition conditions are selected on the basis of CVD phase stability diagrams constructed using thermodynamics-based modeling of the CVD process.

In still another embodiment of the present invention, wherein the thermodynamic analysis of the CVD process is carried out separately for the CVD process performed in argon ambient, and for a CVD process performed in an oxidizing ambient such as that of oxygen, ozone ($O_3$), or nitrous oxide ($N_2O$) atmosphere in the CVD reactor.

In still another embodiment of the present invention, wherein the precursor manganese compound volatilized is either an organometallic compound or a co-ordination complex with hydrocarbon or other organic moieties.

In still another embodiment of the present invention, wherein the vapors of the precursor manganese compound are transported using an oxidizing gas selected from a group comprising oxygen, ozone and nitrous oxide, in lieu of an inert carrier gas.

In still another embodiment of the present invention, wherein the chemical vapor deposition conditions comprises a deposition temperature ranging from 300° C. to 900° C.; total pressure in the CVD reactor ranging from 2-500 Torr; the precursor vaporizer temperature ranging from 30° C. to 280° C.; the temperature of the line tubing transporting the precursor ranging from 30° C. to 300° C.; precursor carrier gas (argon or other inert gas) flow rate ranging from about 10 sccm to 100 sccm; the flow rate of the oxidizing gas if used ranges from about 0 to 300 sccm; and the duration of the CVD process ranges from 2 minutes to 200 minutes.

In still another embodiment of the present invention, wherein the chemical vapor deposition conditions comprises deposition temperature preferably of about 650° C.; reactant pressure preferably of about 5 Torr; precursors vaporizer temperature preferably of about 230° C.; precursor transport line temperature preferably of about 250° C.; precursor carrier gas flow rate preferably of about 50 sccm; oxidizing gas flow rate of preferably of about 50 sccm; and the duration of the CVD process deposition preferably of about 90 minutes.

In still another embodiment of the present invention, wherein the coating thickness is in the range from 30 nm to 11000 nm, preferably about 6000 nm.

In still another embodiment of the present invention, wherein said coating is a carbonaceous metal oxide coating in which elemental carbon acts as a matrix onto which manganese oxide is deposited simultaneously.

In still another embodiment of the present invention, wherein said nanocomposite coated electrode operates at current densities ranging from 1 mA $cm^{-2}$ to 200 mA $cm^{-2}$, preferably about 50 mA $cm^{-2}$ to 100 mA $cm^2$.

In still another embodiment of the present invention, wherein said nanocomposite coated electrode is charged and discharged for a plurality of cycles ranging from 100 cycles to 100,000 cycles, preferably about 100,000 cycles.

In still another embodiment of the present invention, wherein said electrode comprising the nanocomposite coating on a substrate is used to make the complete supercapacitor cell having electrolytes selected from but not limited to a group comprising aqueous potassium hydroxide, aqueous disodium sulphate, and non-aqueous electrolytes, preferably polyacrylonitrile.

The present invention is in relation to a capacitor having electrode coated with a composition represented by formula $Mn_{1-x}O/C$, wherein x is $\geq 0$ and $\leq 0.1$ and C is carbon.

In another embodiment of the present invention, wherein said capacitor is preferably an electrochemical capacitor comprising electrolytic cell, a nickel plate as counter electrode, mercury/mercury oxide/0.5M potassium hydroxide as the reference electrode, working electrode deposited with composition represented by formula $Mn_{1-x}O/C$ wherein x is $\geq 0$ and $\leq 0.1$ and C is carbon, and 0.5 M potassium hydroxide as the aqueous electrolyte.

In still another embodiment of the present invention, wherein the working electrode can be used in three-electrode configuration or a two-electrode configuration.

In still another embodiment of the present invention, wherein the capacitor as single cell assembly has capacitance ranging from about 10 mF per $cm^2$ to about 100 mF per $cm^2$ of the surface area of the substrate, preferably of about 50 mF per $cm^2$ of the surface area of the substrate.

In still another embodiment of the present invention, wherein the capacitor as single cell assembly has time constant ranging from 0.2 millisecond to 20 milliseconds for the charge/discharge cycle, preferably about 2 milliseconds for the charge/discharge cycle.

In still another embodiment of the present invention, wherein the capacitor as single cell assembly can operate effectively at frequencies ranging from 50 Hz to 5000 Hz, preferably of about 500 Hz.

In still another embodiment of the present invention, wherein the capacitor as single cell assembly has an equivalent series resistance ranging from 0.1 ohm to 10 ohm for efficient operation of the capacitor, preferably about one ohm for efficient operation of the capacitor.

In still another embodiment of the present invention, wherein the capacitor as single cell assembly yields a maximum power density ranging from 10 kW/kg to 70 kW/kg, preferably about 40 kW/kg.

In still another embodiment of the present invention, wherein the capacitor as a single-cell assembly can operate at current densities ranging from 1 mA $cm^{-2}$ to 100 mA $cm^{-2}$, preferably about 100 mA $cm^{-2}$.

In still another embodiment of the present invention, wherein the pulse power figure of merit of the electrode material is greater than 100 joules/sec/gm of electrode material.

The present invention is in relation to an electrode coated with composition represented by formula $Mn_{1-x}O/C$, wherein x is $\geq 0$ and $\leq 0.1$ and C is carbon.

In still another embodiment of the present invention, wherein the coating method is selected from a group comprising chemical vapor deposition, atomic layer deposition, spin-coating, dip coating, and combinations thereof.

In still another embodiment of the present invention, wherein the coated electrode is used in conjunction with a capacitor, preferably electrochemical capacitor.

In still another embodiment of the present invention, wherein the composition is coated over substrates which are electrically conducting, selected from, but not limited to, a group comprising nickel, platinum, gold, stainless steel, and a thin film of platinum or gold on a silicon substrate and thin sheet of stainless steel folded to form a compact electrode.

In still another embodiment of the present invention, wherein the capacitance for the coated layer is ranging from 5 $mF/cm^2$ to 100 $mF/cm^2$, preferably about 50 $mF/cm^2$.

The present invention is in relation to a method of coating electrode composition represented by formula $Mn_{1-x}O/C$, wherein x is $\geq 0$ and $\leq 0.1$ and C is carbon, as a nanocomposite coating on the electrode of an electrochemical capacitor in the fields of automobile, aerospace engineering and applications, very large scale integrated circuits (VLSI) technology, micro-electro-mechanical systems (MEMS), and combinations thereof.

In one embodiment of the present invention, a metalorganic chemical vapour deposition (MOCVD) process is used to form a nanocomposite layer/coating. Such a MOCVD process comprises the injection or transportation of the vapours of the precursor, which is a volatile manganese compound. Such a compound may, for example, be a co-ordination complex of manganese, in which manganese atoms are bonded directly to oxygen atoms, at the molecular level. In one specific embodiment, the co-ordination complex is a β-diketonate of manganese, which is a crystalline solid at room temperature that sublimes in the temperature range 130° C.-300° C. Such a complex is vapourized by heating it in a chamber (separated from the MOCVD chamber) to a temperature not exceeding the decomposition temperature of the specific manganese complex chosen. The vapours of this complex react at a suitably high temperature, e.g., 300° C. to 900° C. on the steel substrate that is placed in the MOCVD chamber, depositing the desired layer (film) of carbonaceous manganese oxide, $Mn_{1-x}O$ ($0 \geq x \leq 0.1$). The oxide particles may be amorphous or be crystallites of various sizes up to 25 nanometers. These are embedded in a matrix of elemental amorphous carbon that derives from the precursor compound itself. Thus, the resulting film/coating is a nanocomposite material that is formed in a single-step deposition process. This contrasts with composite electrode materials such as $RuO_2$/carbon, which are formed by mixing respective powdered material through grinding/mixing process, such as in a ball-mill.

In this manner, by choosing a precursor for the MOCVD of manganese oxide and the MOCVD process parameters, a carbonaceous oxide coating (i.e., coating in which elemental carbon acts as the matrix into which manganese oxide is deposited simultaneously) is obtained on a suitable substrate. Such a coating is employed as the electrode material in the supercapacitors developed in the present invention. The coating may be applied on a variety of substrates, including (but not limited to) stainless steel, ceramic alumina, and single crystal silicon. Indeed, the substrate may be made of any metal or metal alloy, which retains its chemical and mechanical integrity when subjected to the elevated temperature and other conditions to which it is subjected during the MOCVD process.

An important part of the present invention is the recognition that "CVD phase stability diagrams" obtained from thermodynamic analysis contain in them clues to the formation of a combination of different chemical products under the same set of CVD conditions. If more than one of these is a solid (condensed phase), the deposit would then be a composite material. Carbon, often viewed as undesirable in thin films and coatings, can be and, in this invention is, incorporated deliberately through the choice of the MOCVD precursor and MOCVD process parameters. Specifically, composite coatings of carbon and a metal oxide can be deposited by MOCVD, through the appropriate choice of the metalorganic precursor and the MOCVD process conditions. As it is possible to calculate the percentage of carbon in the film through thermodynamic analysis, such calculations may be employed to select the experimental conditions for deliberate inclusion of carbon in the deposit or the deliberate exclusion of the carbon from the deposit. Further, from the CVD phase stability diagrams obtained from (equilibrium) thermodynamic analysis of the process, various thermodynamically allowed material combinations (composite materials) emerge naturally.

In a specific embodiment, the carbonaceous manganese oxide layer may be deposited on a metal layer (or a layer of a metal alloy) that has been previously deposited on a substrate, such as a single crystal silicon wafer. This enables the formation of a supercapacitor as a part of a microelectronic device fabricated on a wafer of silicon or another semiconductor.

An embodiment of the supercapacitor electrode of the present invention may comprise a substrate made of a conducting material such as Ferro-steel alloy of suitable alloy composition, such as stainless steel 316 (SS316). Such a substrate performs the function of providing support to the electrode material, as well as serving as the material through which electrical contact is provided to the supercapacitor constructed using the electrode. A coating (film) of carbonaceous manganese oxide is deposited on the substrate by metalorganic chemical vapour deposition (MOCVD) carried out at an elevated temperature. The temperature of the substrate during film deposition, the total pressure of the MOCVD chamber during deposition, and the flow rates of the different gaseous chemical species that lead to the deposition of the desired manganese oxide layer/coating may all be varied and controlled. These CVD process parameters are chosen in consultation with the CVD phase stability diagram described above. This layer of manganese oxide is, in fact, a composite of manganese oxide and elemental amorphous carbon, which are deposited simultaneously in the MOCVD process, the result of the vaporized chemical species containing carbon as a part of their molecular composition and molecular structure. That is, manganese oxide is embedded in the amorphous manganese oxide/carbonaceous matrix. Analysis of the layer/coating shows that it consists of nanoparticles of $Mn_{1-x}O$. Thus, the deposited layer/coating forms a nanocomposite material. Furthermore, as the chemical reaction in the CVD process occurs at an elevated temperature on the ferro-steel substrate, an interfacial layer is formed on the substrate-film interface, leading to strong adhesion between the layer/coating and the substrate.

Because the manganese oxide particles (grains) are deposited within such an amorphous manganese oxide/carbonaceous matrix, they are of a very small size, usually in the nanometer size range. As a consequence, the specific surface area of the layer (surface area of the film per unit mass of the film material) is very high, and exceeds 2000 $m^2$/gram. Further, the presence of carbon in the film provides the electrical conductivity that is needed to transport electric charge. The combination of the large surface area of the film and its electrical conductivity leads to a large specific capacitance (capacitance of the electrode material per unit mass), i.e., the resulting substrate/film structure is appropriate for a supercapacitor electrode.

The capacitance of capacitors, assembled using electrodes made of the electrode material of the present invention, was measured using three-electrode cell system with KOH as the electrolyte, employing methods well known in the art. Three-electrode cell system one electrochemical experiments were performed using a cell consisting manganese oxide film deposited on SS316, Nickel foil and Hg/HgO electrodes as working, counter, and reference electrode, respectively. The electrolyte was 0.5 M aqueous KOH solution (pH~13.7) [21] in the negative potential ranges of 0 V to −0.9 V and the positive potential range 0 V to 0.6 V, w.r.t. Hg, HgO/KOH reference electrode. Our electrode material comprised of $Mn_{1-x}O$ and carbon material composite in the nanometer range, straddling the amorphous/crystalline regime, so the pseudocapacitance mechanism is likely to be different from that in $MnO_2$. The specific capacitance achieved using the electrode material of the present invention (and measured as detailed above) is of the order of 500 F/g, where electrode mass is taken as the mass of the $Mn_{1-x}O$/C nanocomposite material deposited on the substrate.

In the case of two-electrode cell system, both working electrode and counter electrode are made of the same material and the reference electrode is not present in the cell; the counter electrode itself acts as the reference electrode. The potential range is doubled and the capacitance is halved with respect to the three-electrode cell assembly for the same electrolyte.

Further features and advantages of the invention, as well as the structure and operation of various embodiments of the invention, are described in detail below with reference to accompanying drawings. In the drawings, like reference numbers generally indicate identical, functionally similar and/or structurally similar elements. The drawing in which an element first appears is indicated by the leftmost digit(s) in the corresponding reference number.

The technology of the instant Application is further elaborated with the help of following elaborations and examples. However, the elaborations and examples should not be construed to limit the scope of the invention.

Elaboration: 1

Five factors may be said to determine the desirability of electrode material in ECs—(1) High specific surface area of electrode material (surface area per unit mass, often expressed in $m^2$/g) so that capacitance of the electrode material is enhanced. (2) Reversibility of the pseudo-redox reaction in electrode material (no change in the phase of the material should occur). (3) Conductivity of the electrode must be high. (4) Adherence of the electrode material, if coated on a substrate (which may be the current collector), should be strong to ensure a long life cycle. Strong adherence not only increases cycle life, but also provides firm contact of the electrode material with the substrate, which also acts as the current collector. This feature enhances the maximum power density at which the capacitor may be operated. (5) Thickness of the coating and efficiency of the electrode material: an increase in the thickness may decrease the efficiency of the material (because it increases in the weight of the capacitor). Thus, a relatively small thickness of the layer/coating is desirable.

Therefore, the method of preparation of the electrode, in addition to its composition, plays an important role in achieving high capacitance.

Example: 1

FIG. 2 shows the schematic supercapacitor electrode structure in an embodiment of the present invention. It comprises an electrical conductor, 200, which acts both as a current collector and as a physical support, or substrate, for the carbonaceous oxide coating, 210, to be described in detail below. Thus, for example, the substrate 200 may be piece of a metal or a metal alloy, which can survive the chemically reactive, elevated temperature ambient of the CVD process required for the fabrication of the carbonaceous oxide coating 210. In one embodiment of the present invention, the substrate is made of stainless steel. Any formulation of stainless steel, such as the alloy SS316 or SS316L, would be suitable as substrate material. A preferred embodiment of such a substrate 100 is a thin sheet of steel (sometimes called "shimstock"), which has the advantage that it may be rolled up to give a compact (cylindrical) structure. Alternatively, the carbonaceous oxide coating 110 may be deposited on a conducting layer that has been previously deposited on a substrate such as, say, silicon. For example, the carbonaceous oxide coating may be deposited on a thin layer of platinum, gold, nickel, copper, cobalt, or a suitable metal alloy deposited (by some appropriate method) on a piece of silicon (or any substrate material, such as GaAs, which is employed in semiconductor VLSI and other thin film technologies).

An aspect of the present invention enables the deposition of a carbonaceous manganese oxide layer on a suitable, electrically conducting substrate, through a chemical vapour deposition (CVD) process that employs a precursor material incorporating manganese-oxygen chemical bonds in its molecular structure. FIG. 3 shows the general molecular structure, 300, of the β-diketonate complex of a metal M, where $R_1$ and $R_2$ are the terminal-groups attached to the ligand and may be changed to adjust suitably ("tune") the reactivity and volatility of the complex. $R_1$ and $R_2$ may be an alkyl group such as $CH_3$, $C_2H_5$, etc., or an alkoxide group such as $OCH_3$, $OC_2H_5$, etc. FIG. 3a shows the molecular structures of d iaquobisacetylacetonatomanganese(II), and trisacetylacetonatomanganese(III), which may be represented respectively as $[Mn(acac)_2(H_2O)_2]$, 310, and $[Mn(acac)_3]$, 320, when $R_1=R_2=CH_3$. Due to such a molecular structure, and due to the conditions chosen carefully and deliberately for the CVD process, as detailed hereunder, a layer of manganese oxide is deposited, which has a significant proportion of elemental carbon in it, resulting in manganese oxide particles that are either amorphous or nanocrystalline in nature. This results in a large specific surface area (generally expressed in meter$^2$/gram of the material in question). A large specific surface area being essential to achieving high capacitance, the material and the process described herein may be employed to fabricate supercapacitors.

In a preferred embodiment of the invention, diaquobisacetylacetonatomanganese(II), denoted by $[Mn(acac)_2(H_2O)_2]$, is employed as the manganese precursor for the MOCVD process used to obtain the layer/coating that comprises the electrode. The vapourization characteristics of such a precursor are important in the development of the CVD process, and these are determined by thermal analysis, as well known in the art. FIG. 4 is the thermal analysis of the $Mn(acac)_2(H_2O)_2$, which contains data from simultaneous thermogravimetric (TG) and differential thermal analysis. It is seen from FIG. 4 that a significant weight loss occurs in the temperature range 180° C.-280° C. Thus, this precursor must be vapourized at a temperature within this range in a CVD process. If a different manganese compound is used as precursor, the range of temperatures over which it must be vapourized in a CVD system is to be determined using thermal analysis of the type illustrated in FIG. 4.

The manganese complex chosen as the starting material (CVD precursor) is subjected to a series of other analyses, including (but not limited to) mass spectroscopy, so that the various fragments (moieties) that arise from it due to its decomposition under CVD conditions may be deduced and listed. FIG. 5 is the mass spectrum of $Mn(acac)_2(H_2O)_2$ was recorded in the electron impact mode at 70 eV. The peak at m/z=289 corresponds to the molecular ion, confirming the formation of the complex. Mass spectroscopic analysis of the complex is generally carried out at low pressures by employing an electron beam to break the complex into various fragments. While all the observed fragments are not necessarily involved (formed) in a CVD process, the mass analysis can be used to arrive at a plausible mechanism of the reactions that occur in the CVD process that leads to the formation of the desired coating. This methodology obviates the need for installing a dedicated mass spectrometer at the exhaust of the CVD chamber, so that all the actual products of the CVD process involved are identified. As a dedicated mass spectrometer is generally very expensive, the methodology described in this invention results in a cost-effective way of analyzing a low-pressure CVD process of the type employed in this invention. This cost-effectiveness is an important aspect of the present invention.

Elaboration 2:

FIG. 6 shows the flowchart for the methodology adopted for the thermodynamic modeling of the CVD process that employs the specific metalorganic complex used in it. Equilibrium thermodynamic analysis of such a reaction comprises the minimization of the total Gibbs free energy of the reaction, for all the reactants and reaction products put together. Therefore, such an analysis requires the enumeration of all the possible species that might result from the decomposition of the metalorganic complex and from the reaction of the complex with any other chemical introduced into the CVD chamber, such as oxygen gas. As such, the analysis may begin with a mass-spectrometric analysis of the complex, which enables the listing of the many fragments into which it could break during a chemical reaction. The list of such fragments is generally long when a metalorganic complex is involved in a reaction. (This list will be different when it includes products in a typical CVD process, which includes a reactive gas such as oxygen.) As thermodynamic modeling of the reaction involves the minimization of the total Gibbs free energy of the system [40], the free energy of each of the species present in the CVD process must be known as a function of temperature. These data have to be obtained from standard sources that compile such thermochemical data. For the methodology to be accurate and useful, i.e., to be able to make predictions with experimental realism, it is necessary that a careful and correct choice of all the chemical species present at equilibrium be made. This may be achieved through a careful analysis of the mass spectral data and an understanding of the mechanisms of the chemical reactions that are involved in the CVD process [41,42].

Example: 2

An important aspect of the present invention thus pertains to the application of thermodynamic modeling of the CVD process in order predictively to choose the temperature, pressure, and other conditions under which it is conducted, so that the desired nanocomposite, carbonaceous oxide material is deposited on the substrate. In the thermodynamic investigation, concentrations of the various solid and gaseous phases are predicted for a particular precursor (procedure described in ref [41,42], flow chart presented in FIG. 6), as functions of substrate temperature ($T_{sub}$), total pressure (P) in the CVD reactor, and the ratio of flow rates of oxygen and the manganese precursor, denoted by ($O_2$/Pre).

For the specific case of the CVD process carried out in argon (no oxidant gas being present) when the metal precursor diaquobisacetylacetonatomanganese(II), the list of chemical species included in thermodynamic calculations is given in Table I.

TABLE 1

The phases considered for the thermodynamic analysis of MOCVD in argon and oxygen atmospheres.

| Atmosphere | Precursor | Phases |
|---|---|---|
| Argon | H(acac) | Solid: C<br>Gas: CO, $H_2$, $CH_4$ (methane), $C_2H_2O$ (ketene), $CH_3CHO$ (acetaldehyde), $CH_3COCH_3$ (acetone) |
|  | $Mn(acac)_2$—H(acac) | Solid: Mn, $Mn_3O_4$, $Mn_2O_3$, $MnO_2$, $Mn(OH)_2$, $MnCO_3$, C<br>Gas: CO, $H_2$, $C_2H_2O$ (ketene), $CH_3CHO$ (acetaldehyde) |
| Oxygen | $Mn(acac)_2$ | Solid: Mn, $Mn_3O_4$, $Mn_2O_3$, $MnO_2$, $Mn(OH)_2$, $MnCO_3$, C<br>Gas: CO, $CO_2$, $H_2O$, $C_2H_2O$, $C_2H_4O$, HCOOH (formic acid), $CH_3COOH$ (acetic acid) |

Example: 3

FIG. 7 shows variations in the calculated equilibrium molar concentrations of various condensed and gaseous phases as a function of temperature in argon atmosphere (i.e., without oxygen or any other oxidant) at P=5 Torr, when $Mn(acac)_2(H_2O)_2$ is used as the precursor material. As both $Mn_{1-x}O$ and carbon are "condensed" on to the substrate under the range of conditions represented by FIG. 7, the deposit forms a composite material. The FIG. 7 thus indicates the formation of $Mn_{1-x}O/C$ composite of this invention, irrespective of temperature. The large proportion of carbon (5 moles compared to 1 mole of $Mn_{1-x}O$, as in FIG. 7) in the deposit compared to that of $Mn_{1-x}O$ suggests that carbon may be thought of the "matrix" in which $Mn_{1-x}O$ particles are embedded in a homogeneous fashion, as both species are deposited simultaneously on to the substrate. The relatively large proportion of carbon in the deposit may be surmised to a limiting of the size of the $Mn_{1-x}O$ crystals. This is because, during the deposition of a coating or a film, the particle size depends on the mobility of the growth species, as is well known in the art. The carbon particles deposited in profusion and simultaneously with $Mn_{1-x}O$ particles limit the mobility of the oxide growth species. Indeed, part of the $Mn_{1-x}O$ is amorphous, as established by the electron diffraction data shown in FIG. 12.

Example: 4

FIGS. 8(a) and 8(b) show the results of thermodynamic calculations for the MOCVD process carried out employing $Mn(acac)_2(H_2O)_2$ and oxygen as the reactants. FIG. 8(a) shows the relative proportions of different condensed phases formed on the substrate kept at 700° C., as the molar ratio of oxygen to $Mn(acac)_2(H_2O)_2$ (denoted by $O_2$/Pre) is varied. In particular, this diagram shows the variation of the proportions of different manganese oxide phases formed as the ratio $O_2$/Pre is varied. [The upper limit to the number of moles of oxygen that can be consumed by one mole of the $Mn(acac)_2(H_2O)_2$ precursor is 12.5, based on the assumption of complete oxidation of Mn, C, and H to $MnO_2$, $CO_2$, and $H_2O$, respectively. [Any extra amount of oxygen does not affect the calculations, though in the actual deposition process, this extra oxygen may change the hydrodynamics of the system.] FIG. 8(b), which represents the "CVD phase stability diagram", illustrates the formation of different composites, such as $Mn_{1-x}O+Mn_3O_4$ and $Mn_3O_4+Mn_2O_3$, etc., in addition to the composite $Mn_{1-x}O/C$, under different CVD conditions. Thus, various thermodynamically allowed material combinations (i.e., composites) emerge naturally from a CVD phase stability diagram of the type shown in FIG. 8(b). Thermodynamic simulation, therefore, constitutes a route to the realization of different combinations of materials in a composite form, through the CVD process because, in such a process, the different materials are deposited simultaneously under a chosen set of CVD process conditions. Alternatively, CVD phase stability diagrams also illustrate the deposition of a phase, which may be regarded as an "impurity" in another phase which is the desired one. In such a case, the CVD phase stability diagram may be used to select CVD process conditions (temperature, pressure, relative concentration of reactants), which lead to the deposition of the desired phase exclusively. For example, if a deposit of $Mn_{1-x}O$ is desired with no carbon in it, an appropriately high temperature of deposition, or a higher rate of oxygen flow (or both) may be employed, as deduced from FIG. 8(b).

Elaboration 3:

The methodology of producing the nanocomposite, carbonaceous metal oxide coating of this invention is summarized in the flowchart given in FIG. 9. It must be noted that the methodology is to be followed separately for each different compound of a metal used as the metal precursor in the CVD precursor. For example, a separate "CVD phase stability diagram" has to be constructed for the precursor in question, analogous to either FIG. 7 (without any oxidant gas used) or to FIG. 8(b), which applies when an oxidant gas is used. CVD process conditions deduced from such a phase stability diagram, appropriate to the deposition of the carbonaceous oxide composite material, are then to be used to obtain the electrode material of the type described in this invention.

An important aspect of the present invention is the recognition that, by carefully choosing the manganese compound, and by constructing the "CVD phase stability diagram" for this compound, it is possible to obtain the $Mn_{1-x}O/C$ composite coating under appropriate CVD conditions, as read from the "CVD phase stability diagram". In particular, the relative proportions of $Mn_{1-x}O$ and C in the composite may be tailored by choosing the appropriate CVD process conditions. Thus, the teaching of the present invention is very general and broad in scope.

Another aspect of the invention is that the presence of a measurable and substantial proportion of elemental carbon in the coating, deposited simultaneously with manganese oxide, imparts electrical conductivity to the film. This is directly relevant to the application of the coating as electrode material in supercapacitors, wherein efficient transport of charge to the stainless steel substrate (the current collector) is essential. The elemental carbon present in the coating provides electrical conductivity to it, even if the manganese oxide present in the coating may not, by itself, be a good conductor of electricity.

Example: 5

Yet another aspect of the present invention is that the manganese oxide phase present in the coating is very fine-grained (FIG. 10). The morphology of the coating is best described as resembling a cauliflower, with clusters of nanometer-sized particles as the main structural feature. If the coating contains crystalline particles (crystallites), they are too small in dimension to give an X-ray diffraction pattern (FIG. 11). This pattern contains peaks which are entirely due to the steel substrate, and not to the carbonaceous oxide coating. (In other words, the coating is X-ray amorphous, necessitating the application of electron diffraction to investigate the crystallinity of the coating. Electron diffraction (FIG. 12) shows that while some of the coating comprises nanometer-sized crystals of $Mn_{1-x}O$ (measuring up to 30 nm in dimension), some of the $MnO_{1-x}O$ is amorphous in nature. Furthermore, the coating has (and hence the clusters have) elemental carbon and amorphous manganese oxide throughout, in which the aforesaid nanocrystals of manganese oxide are embedded. This carbon is amorphous in nature, as revealed by TEM analysis. These characteristics are responsible for the large specific surface area of the coatings, greater than about 2000 $m^2$/gram, as measured by the well-known BET technique. Such a large specific surface area is known to be essential to the high capacitance that characterizes supercapacitors. [The surface areas measured by the BET technique understate the actual values, because the BET apparatus is usually not optimized for measurement of thin layers/coatings.]

An important aspect of the invention that stems from the morphology described above and the presence of carbon is that the coating has a high electrical conductivity, a very desirable characteristic in an electrode material. Although manganese monoxide ($Mn_{1-x}O$) is a poor electrical conductor, the fact that the oxide crystallites are embedded in amorphous carbon ensures a high electrical conductivity (The measured electrical resistance of the carbonaceous $Mn_{1-x}O$ coating is of the order of $100\Omega$, whereas the resistance of a coating of pure $Mn_{1-x}O$ of the same thickness would be greater by several orders of magnitude.)

Elaboration 4:

Another important aspect of the invention is the application of the x-ray photoelectron spectroscopy (XPS) technique to establish that a large fraction of the manganese present in the film/coating is in the $Mn^{2+}$ oxidation state, in the form of $Mn_{1-x}O$ (FIG. 13a). The XPS binding energy peaks correspond to Mn $2p_{3/2}$ and Mn $2p_{1/2}$ of the electrode material, shown in FIG. 13a, match the XPS data in reference [43], which state that Mn $2p_{3/2}$ binding energy peak of the $MnO_{1-x}O$ highly dispersed in carbon (642.28 eV) increases by 0.53 eV from the binding energy of Mn $2p_{3/2}$ in bulk $Mn_{1-x}O$ (641.75 eV). This is attributed to the cluster size being smaller than that required for bulk band properties [44-46]. This trend was observed in our electrode material consistently, indicating that the $Mn_{1-x}O$ crystallites are highly dispersed. Or, in other words, the $Mn_{1-x}O$ crystallites are very small in size and homogenously distributed in the elemental carbon that forms the matrix in the coatings of the present invention. This conclusion is also supported by SEM images, from which it was concluded that crystallite sizes are very small—not larger than 30 nm—and homogenously distributed in amorphous carbon.

XPS binding energy peak of O 1 s of the electrode material were deconvoluted into its three components shown in FIG. 13b. These were assigned for Mn—O—Mn (530.9 eV), Mn—O—H (532.9 eV) and H—O—H (534.9 eV) binding energy peaks.

XPS binding energy peak of the C 1 s (FIG. 13c) is deconvoluted into three component corresponding to 285.1 eV ($sp^2$ carbon), 287.1 eV ($sp^3$ carbon). The shifts to higher binding energy occur due to amorphous nature of the carbon in the coating/film. It is important to note from the XPS binding energy of the C 1 s peaks that there is more $sp^2$ type of carbon than $sp^3$ type, which is one of the factors responsible for the good conducting behavior of the film/coating.

Thus, the XPS data also confirm that the carbon present in the film/coating is elemental and that it is predominantly of the $sp^2$ type (graphitic), leading to the observed high electrical conductivity of the composite layer/coating. These aspects chemical nature and composition of the electrode material of the present invention make it different from materials described in the prior art for supercapacitor electrodes. Specifically, even though the use of manganese dioxide ($MnO_2$) as the electrode material in supercapacitors is well known in the art, there appears to be no report of a supercapacitor electrode constructed in which elemental carbon and manganese monoxide ($Mn_{1-x}O$) are the significant constituents, and which is fabricated using the MOCVD process.

Example: 6

The above data and descriptions demonstrate a very significant aspect of the present invention is that the process of MOCVD, employed as described in this invention, leads to an intimate composite of an oxide and elemental carbon in such a way to form a "nanocomposite". This is a direct and natural consequence of a single coating process. This is in contrast to the multiples steps often employed in the manufacture of composites, usually involving some method of mixing, required to form the oxide-containing electrode of a supercapacitor. The present method ensures, through the extensive incorporation of elemental carbon in the coating, that the grains of the oxide do not grow to dimensions larger than a few tens of nanometers. This is because, during the growth of layer/coating, the mobility of the grains of manganese oxide is likely to be limited by the pervasive presence of carbon, which is simultaneously deposited, preventing grains from growing in beyond ~30 nm. In fact, as the electron diffraction pattern of the coating shows (FIG. 12), part of the manganese oxide deposited is amorphous, reinforcing the hypothesis that the large proportion of carbon in the layer/coating limits the mobility of the growth species of manganese oxide.

Capacitors were assembled with electrodes made of the carbonaceous manganese oxide coating on stainless steel substrate. Their capacitance was measured using three and two electrode cell systems illustrated in FIGS. 14a and 14b respectively, employing electrochemical characterization techniques (cyclic voltammetry) in a manner well known in the art. The cell consists of: the nanocomposite coating of $Mn_{1-x}O/C$ on SS316 as the working electrode, Nickel foil as the counter electrode, and Hg/HgO as the reference electrode, respectively. The electrolyte was 0.5 M aqueous KOH solution (pH~13.7) [21] in the negative potential range of 0 V to −0.9 V and the positive potential range of 0 V to 0.6 V, w.r.t. Hg, HgO/KOH reference electrodes.

As is well known in the relevant art, capacitors can be assembled in series and in parallel using a plurality of electrodes, to achieve specific electrical characteristics and performance. This is a natural extension of the two-electrode assembly illustrated in FIGS. 14(a) and 14(b).

Example: 7

FIG. 15 is the cyclic voltammogram (CV) of the three electrode cell system described above, obtained at the scanning rate of 50 mV/sec. The CV data show an approximately rectangular loop, over both positive and negative potential ranges, illustrating typical capacitor behavior. The nearly rectangular shape of the voltammogram shows also that the capacitor assembled using electrodes of the present invention would serve efficient stores of energy. The CV cycle shows that the $Mn_{1-x}O/C$ electrode is nearly reversible. The peaks in the voltammogram of FIG. 15 are indicative of the pseudocapacitance mechanism extant in the $Mn_{1-x}O/C$ electrode system, which contributes in part to the measured capacitance.

The electrode material of the present invention is the nanocomposite of $Mn_{1-x}O$ and carbon, straddling the amorphous/crystalline regime. Hence, the pseudocapacitance mechanism is likely to be different from that in $MnO_2$. As is well known in the art, a metal oxide electrode follows the pseudocapacitance mechanism where there is partial change in the oxidation state of the metal oxide on the surface of the film, unlike pure activated carbon electrode, which follows double-layer mechanism where charge separation is purely electrostatic. In a double-layer capacitor, the CV shows perfect rectangular shape cycle, while pseudocapacitance has an irregularity associated with it. But the capacitance arises from the pseudocapacitance will be larger than that of double-layer capacitor.

Still another aspect of the present invention pertains to the strong adhesion between the carbonaceous oxide coating, $Mn_{1-x}O/C$, and the substrate, resulting from the process described herein. Strong adhesion of the electrode material to the substrate (current collector, SS316 in preferred embodiment of the present invention) is very important to their utilization as supercapacitor electrodes. This is because such a capacitor is expected to survive thousands of charge-discharge cycles in the chemically reactive ambient of the electrolyte. The MOCVD process described herein for the deposition of the $Mn_{1-x}O/C$ layer/coating is generally conducted at an elevated temperature of a few hundred degrees Celcius—the temperature at which the substrate (SS316, for example) is held during the coating process. Depending on the substrate/film material combination, the elevated temperatures at which MOCVD is conducted involves interfacial interactions that result in the formation of a thin interfacial layer (generally about a nanometer thick) that lies between the substrate and the intended coating. Such an interfacial layer produced by chemical reaction as an integral part of the coating process leads to strong adhesion between the substrate and the coating. Thus, no separate post-deposition processing steps, such as annealing or ion bombardment, are required, resulting in savings in processing and energy costs. In the present invention, it is found that the adhesion of the carbonaceous oxide coating to the steel substrate is strong, as tested by the well known adhesive tape peel test.

Further analysis of the electrochemical characteristics of the electrode material of the present invention was carried out by impedance spectroscopy and chronopotentiometry, in addition to cyclic voltammetry. These measurements reveal the advantages in electrode performance gained from the electrode material of the present invention and from the process of fabricating the same, as described hereunder.

With improved adhesion of the electrode layer/coating to the substrate and its reduced thickness, the interfacial resistance between the film/coating and conducting substrate is lower. This improves charge transport between the electrode material and the conducting substrate, resulting in a reduced time constant, as shown in the Bode impedance plot of FIG. 16, obtained for the $Mn_{1-x}O/C$ electrode material deposited on stainless steel (SS316). From this plot, the phase angle found to be −45° at 460 Hz, characterizing capacitive behaviour of the electrode, and denoting the upper frequency limit of such capacitive behaviour. The capacitive behaviour is demonstrated also in the Nyquist plot of FIG. 17. The linear segment with a large slope at lower frequencies evidences its capacitance behavior. (It is to be noted that, in general, the Nyquist plot for a capacitor involving the pseudocapacitance mechanism is complicated.)

Example: 8

The data of FIG. 16 and FIG. 17 show that a capacitor employing the electrode material of the present invention can be used at frequencies up to 460 Hz, which is significantly higher than the upper frequency of operation of other oxide-based electrodes known in the art. Accordingly, the response time deduced from measurements for capacitors with electrodes made of the $Mn_{1-x}O/C$ nanocomposite coating does not exceed a few milliseconds (as estimated using the method described by J. R. Miller et al. [47]). This is obtained from the reactance/resistance vs. frequency plot shown in FIG. 18. Where the reactance equals the resistance in such a plot, the capacitance behavior starts to overwhelm the resistance behavior. The time constant of the electrode of the present invention is thus found to be about $2\times10^{-3}$ s, which is considerably smaller than the time constant reported for other metal oxides electrodes [3], demonstrating the efficacy of the electrode material and configuration of the present invention.

The small time constant achieved in the present invention allows supercapacitors to be used in places where a very fast charge-discharge, or a sudden surge of power, is required, as in automatic weaponry, missile guidance systems, advanced pulse power, electronic fuse, lasers, AC mains (50 Hz) supply, and on-board power supply in VLSI or MEMS systems.

The maximum power density of a supercapacitor is given by $P_{max}=V_i^2/4R$ (where $V_i$ is the initial voltage and R is the equivalent series resistance (ESR))[1]. Reducing both the intrinsic resistance of the electrode materials and the contact resistance between the electrode and current collector is the key to attaining high power density. (This is the same as increasing both the intrinsic conductance of the electrode material layer and its interfacial conductance.) Equivalent series resistance depends on the current collector conductance itself, interfacial conductance between current collector (substrate) and electrode material (coating), conductance of the coating itself and ionic conductance of electrolyte. High values of intrinsic and interfacial conductance are achieved in the electrode structure of $Mn_{1-x}O/C$ nanocomposite coating deposited by MOCVD on a conducting substrate like stainless steel (SS316). The intrinsic electrical conductance of the layer/coating is high because of the elemental graphitic carbon present in it in large proportion. Interfacial conductance is high because of the good adherence between the substrate and the coating.

Such good adherence between the $Mn_{1-x}O/C$ layer and the steel substrate therefore allows a supercapacitor comprising electrodes of the present invention to perform at a large current density (more than 50 $mA/cm^2$). Good adherence also provides long cycle life, as it reduces the chance of delamination of the coating from the substrate even after thousands of charge/discharge cycles. These capabilities of the capacitor comprised of the $Mn_{1-x}O/C$ electrode configuration are established through data shown in FIG. 19 and FIG. 20.

An important metric that characterizes a capacitor is the maximum power density that can be drawn from it during its operation. Based on the formula $P_{max}=V_i^2/4R$, and the estimated equivalent series resistance (using the data in FIG. 18), the maximum power density of the capacitor that employs the electrode material of the present invention is found to be in the range 25 kW/kg to 40 kW/kg.

Example: 9

FIG. 19 is the charge-discharge curves for 1 $mA/cm^2$ current density for the electrode material of this invention, prepared under conditions given in the Table II.

TABLE 11

CVD process condition(s) for the deposition of $Mn_{1-x}O/C$ nanocomposite film/coating onstainless steel (and other) substrates

| | |
|---|---|
| Precursor Used | $Mn(acac)_2(H_2O)_2$ |
| Deposition Temperature | 300° C.-900° C. |
| Total Pressure in CVD reactor | 2-500 Torr |
| Precursor Vaporizer Temperature | $Mn(acac)_2(H_2O)_2 \rightarrow$180° C.-280° C. |
| Precursor Line Temperature | $Mn(acac)_2(H_2O)_2 \rightarrow$220° C.-300° C. |
| Purging Gas (Ar) Flow | 100 sccm |
| Carrier Gas (Ar) Flow | 10-100 sccm |
| Reactant Gas ($O_2$) Flow | 0-300 sccm |
| Deposition Time | 2 to 200 min |
| Film Thickness | 30-15000 nm |
| Substrates | SS316, SS316L Si(100), fused quartz, $SiO_2$/Si(100), and Ceramic alumina |

Capacitance was measured using formula ($C=I\Delta t/\Delta V$, where C is the integrated capacitance per unit area, $\Delta t$ is the discharge time interval and $\Delta V$ is the potential range). The capacitance measured for the particular film of this Figure was 11 $mF/cm^2$. FIG. 20 is the plot of the integrated capacitance as a function of the number of cycles in the charge-discharge curve of the electrode material prepared under conditions listed in Table 1. The charge-discharge data were taken at a constant current density of 50 $mA/cm^2$.

Yet another important aspect of the invention deals with the uniform nature (in composition and thickness) of the coating on the substrate, as prepared using the MOCVD process described in this invention. The process also permits the coating of large area substrates uniformly so as to form a capacitor that can deliver a large total current (current density multiplied by electrode area). For example, such a substrate may be a thin sheet of stainless steel, several of which may be stacked together to form a capacitor that can deliver a large current at an enhanced voltage (parallel stacking of electrodes). Or, thin steel sheets coated with the electrode material may be rolled into a compact cylindrical shape to yield a "rolled-up" supercapacitor of a large capacitance value. As the MOCVD process described in this application yields coatings of a large area and of uniform thickness, this process can be employed to produce supercapacitors in a reproducible manner.

The aforesaid aspects of the present invention teach how a device with a large capacitance, suitable for applications requiring the storage and quick release (on demand) of a large amount of energy, may be constructed by scaling up the process so as to apply the carbonaceous oxide coating over large sheets of the substrate material that may be rolled up into a device that is ultimately compact and lightweight. Such a supercapacitor is desirable in automotive and aerospace applications.

Contrariwise, an aspect of the present invention is that it allows the fabrication of supercapacitors of small dimensions, to serve in applications involving very large scale integrated (VLSI) circuits and MEMS devices, where "on-board" storage of energy is desired, which is available at high power densities. The MOCVD process described in this invention, which is consistent with processes generally used in the fabrication of VLSI and MEMS devices, permits the "integration" of supercapacitor structures within them, eliminating the cost and complexity of external power sources needed for their operation.

And another important aspect of the invention is that the electrode material described here allows the use of different types of electrolyte for the purpose of making a complete supercapacitor structure. Either aqueous electrolytes, such as an aq. KOH solution or an aq. $Na_2SO_4$ solution, aqueous gel electrolyte such as polyvinyl alcohol (PVA) and polyacrylic alcohol (PAA) or non-aqueous gel electrolytes such as polyacrylonitrile (PAN) and polymethamethylacrylate (PMMA), may be used to make the complete supercapacitor cell. The electrode material and the substrate material (ferro-steel alloy) are compatible with use of these different electrolytes.

Yet another important aspect of the present invention is elaborated through a metric known as the "Pulse power figure-of-merit" (FOM), which is defined by J. R. Miller et. al. [47] calculated for $Mn_{1-x}O/C$ nanocomposite film, is in the range of 100-800 Joule per second per gram for the mass of the film and not to the mass of the total electrochemical cell, which define the property of only electrode material. Inefficient increases in the mass of the device, which do not contribute to the capacitance, reduce the pulse power FOM of device. This is important to note that MOCVD process allow to deposit the film on-board where the electrochemical cell will be the part of the electrical circuit rather than the separate entity, which also reduce the overall extra mass due to packing and supporting current collector etc. MOCVD process allows reducing the mass of the device with a great extent, so the pulse power figure of merit for the device is in the range of 1-50 Joule per second per gram. This part is also described in the FIG. 2. Also due to high FOM of the pure electrode material, even if the total mass of device is nearly 0.005 gram (which is really possible in MOCVD process) reduces pulse power FOM of the device in the range of 1-20 Joule per second per gram, which is still very high for the devices. In other words MOCVD process allows getting very high pulse power FOM for the electrode material and also allows manipulating pulse power FOM for the device. The pulse power FOM of the electrode material shows its better performance in fast power withdrawal capability.

It is important to note that the performance characteristics detailed above (such as the capacitance per unit area of the electrode material) refers to a single parallel plate capacitor structure. This performance can be enhanced by having a plurality of such capacitors in different electrical combinations well known in the art.

Several aspects of the invention are described above with reference to examples for illustration. It should be understood that numerous specific details, relationships, and methods are set forth to provide a full and complete understanding of the invention. Any person skilled in the relevant art(s), however, will readily recognize that the invention can and may be practiced without one or more of the specific details, or with other methods, etc. In other instances, the details of well-known structures or operations are left out so as to avoid obscuring the invention.

REFERENCES

1) B. E. Conway, *Electrochemical Supercapacitors—Scientific Fundamentals and Technological Applications*, Kluwer Academic/Plenum N.Y. (1999).
2) R. Kötz, M. Carlen, Electrochim. Acta 45 (2000) 2483.
3) A. Burke, J. Power Sources 91 (2000) 37.
4) I. Tanhashi, A. Yoshida, A. Nishino, J. Electrochem. Soc. 60 (1996) 249.
5) European Patent 1122751, "Electrode and its manufacturing process", Chiavarotti Giovanni Pietro (IT); Rossi Christian (IT).
6) U.S. Pat. No. 6,517,972, "High energy density hybrid battery/supercapacitor system", Amatucci; Glenn (Peapack, N.J.).
7) U.S. Pat. No. 5,585,999, "Supercapacitor electrochemical cell", De Long; Hugh C. (Colorado Springs, Colo.), Carlin; Richard T. (Colorado Springs, Colo.).

8) E. Frackowiak, B. Béguin, Carbon 39 (2001) 937.
9) G. Arabale, D. Wagh, M. Kulkarni, I. S. Mulla, S. P. Kernekar, K. Vijaymohanan, A. M. Rao, Chemical Phys. Lett. 376 (2003) 207.
10) D. M. Kolb, Surface Science 500 (2002) 722.
11) B. E. Conway, J. Electrochem. Soc. 138 (1991) 1539.
12) J. P. Zheng, J. Huang, T. R. Jow, J. Electrochem. Soc. 144 (1997) 2026.
13) Zheng, Z. P. and Jow, T. R., J. Electrochem. Soc., 142, L6 (1995).
14) U.S. Pat. No. 6,737,445, "Mesoporous carbons and polymers", Bell Willium (US); Dietz Steven (US).
15) Eisenmann, E. T. (1995) *Design Rules and Reality Check for Carbon-Based Ultracapacitors*, NTIS No. DE95010575/HDM. Springfield, Va.: NTIS.
16) U.S. Pat. No. 6,710,366, "Nanocomposite materials with engineered properties", Lee Howard Wing Hoon (US), Keshavarz Majid (US).
17) U.S. Pat. No. 6,491,789, "Fibril composite electrode for electrochemical capacitors", Niu Chun-Ming (US).
18) U.S. Pat. No. 6,205,016 "Fibril composite electrode for electrochemical capacitors", Niu Chun-Ming (US).
19) DE 10312999, "Preparation of an electrode for supercapacitors comprising deposition of a strongly adhering dendritic micro- or nanoporous metal layer useful for batteries, in automobile construction, and in the telecommunication industry", Daimler Chrysler Ag (DE).
20) DK685859T or EU0685859, "Method of making an electrode for a supercapacitor", Andrieu Xavier (FR), Cottevieille Denis (FR), Cariou Frederic (FR).
21) E. R.-Pinero, V. Khomenko, E. Frackowiak, and E. Béguin, J. Electrochem. Soc. 152, A229 (2005).
22) S-C. Pang, M. A. Anderson, T. W. Chapman, J. Electrochemical Soc., 147 (2000) 444.
23) M. Toupin, T. Brousse, and D. Belanger, Chem. Mater., 14 (2002) 3946.
24) N. Y. Lee, and J. B. Goodenough, J. Solid State Chem. 144 (1999) 220.
25) H. Y. Lee, S. W. Kim, and H. Y. Lee, Electrochem. Solid State Lett. 4 (2001) A19.
26) Y. U. Jeong and A. Manthiram, J. Electrochem. Soc. 149 (2002) A1419.
27) D. J. Jones, E. Wortham, J. Roziére, F. Favier, J. L. Pascal and L. Monconduit, J. Phys. Chem. Solids 65 (2004) 235.
28) R. N. Reddy, R. G. Reddy, J. Power Sources 124 (2003) 330.
29) R. N. Reddy, R. G. Reddy, J. Power Sources 132 (2004) 315.
30) M. S. Hong, S. H. Lee, S. W. Kim, Electrochem. Solid State Lett. 5 (2002) A227.
31) U.S. Pat. No. 6,818,118, "Anodically formed intrinsically conductive polymer-aluminium oxide composite as a coating on aluminium", Kinlen Patrick J (US), Lawless Lawrence M (US), Menon Vinod P (US).
32) M.-S. Wu, P.-C. J. Chiang, Electrochem. Solid State Lett. 7 (2004) A123.
33) C. C. Hu, T. W. Tsou, Electrochemica Acta 47 (2002) 2381.
34) C. C. Hu, T. W. Tsou, Electrochemica Acta 47 (2002) 3523.
35) V. Srinivasan, J. W. Weidner, J. Electrochem Soc. 130 (1983) 869.
36) S. Y. Kang, K. H. Choi, S. K. Lee, C. S. Hwang, and H. J. Kim, J. Electrochem. Soc., 147 (2000) 1161.
37) G. B. Stringfellow, *Organometallic Vapour Phase Epitaxy-Theory and Practice*, Academic Press, New York (1989).
38) C. Bernard, C. M. Pons, E. Blanquet, R. Madar, MRS Bull., 24 (1999) 27.
39) P. Sourdiaucourt, A. Derre, P. Delhaes, P. David, J. Phys. IV, 9 (1999) Pr8-373.
40) G. Eriksson, Acta Chem. Scand., 25 (1971) 651.
41) S. Mukhopadhyay, K. Shalini, R. Lakshmi, A. Devi and S. A. Shivashankar, Surf. and Coating Tech. 150 (2002) 205.
42) S. Mukhopadhyay, K. Shalini, A. Devi, S. A. Shivashankar, Bull. Mater. Sci. 25 (2002) 391.
43) V. Young and Liang Zhong Zhao, Chem. Phys. Lett. 102, 455, 1983.
44) M. G. Mason, L. J. Gerenser and S.-T. Lee, Phys. Rev. Lett. 39, 288, (1977).
45) R. C. Baetzold, M. G. Mason and J. F. Hamilton, J. Chem. Phys. 72, 366, (1980).
46) R. C. Baetzold, Surf. Sci. 106, 243, (1981).
47) J. R. Miller, Pulse power performance of electrochemical capacitor, Technical status of present commercial devices, presented at 8$^{th}$ International Seminar on Double-Layer capacitors and Similar Energy Systems, Deerfield Beach; Fla., Dec. 7-9, 1998.

We claim:

1. A process for deposition of electrode material of composition represented by the formula $Mn_{1-x}O/C$, wherein x is $\geq 0$ and $\leq 0.1$ and C is carbon, as a nanocomposite coating on a substrate to form a nanocomposite coated electrode configuration, comprising steps of:
    volatilizing a precursor containing manganese and carbon in a vaporizer to obtain vapors of the precursor; and
    contacting the substrate with the precursor vapors under chemical vapor deposition (CVD) conditions; and
    wherein adsorption followed by decomposition of precursor molecules on substrate surface forms the nanocomposite coated electrode.

2. The process as claimed in claim 1, wherein the manganese precursor compound is selected from the group consisting of organometallic compounds of manganese, β-diketones of manganese, a coordination complex of manganese and hydrocarbon, and a coordination complex of manganese and organic moieties.

3. The process as claimed in claim 1, wherein the precursor vapors are transported into a reaction chamber using one or more of (i) a chemically inert gas selected from the group consisting of argon, nitrogen, neon, krypton, and xenon, (ii) an oxidizing gas selected from the group consisting of oxygen, ozone ($O_3$), nitrous oxide ($N_2O$), or a combination thereof, and (iii) a combination of hydrogen ($H_2$) and carbon dioxide ($CO_2$).

4. The process as claimed in claim 1, wherein the substrate is formed of an electrically conducting material, a semiconductor material, an insulator, or a combination thereof.

5. The process as claimed in claim 1, wherein the chemical vapor deposition conditions are selected on the basis of CVD phase stability diagrams constructed using thermodynamics-based modeling of the CVD process.

6. The process as claimed in claim 5, wherein the thermodynamics-based modeling of the CVD process is carried out separately for a CVD process performed in an ambient argon atmosphere and for a CVD process performed in an ambient oxidizing atmosphere.

7. The process as claimed in claim 1, wherein the chemical vapor deposition conditions comprise:
    a deposition temperature ranging from 300° C. to 900° C.;
    total pressure in the CVD reactor ranging from 2-500 Torr;
    the precursor vaporizer temperature ranging from 30° C. to 280° C.;

the temperature of the line tubing transporting the precursor ranging from 30° C. to 300° C.;

a precursor carrier gas flow rate ranging from about 10 sccm to 100 sccm;

the flow rate of the oxidizing gas ranging from about 0 to 300 sccm; and the duration of the CVD process ranging from 2 minutes to 200 minutes.

8. The process as claimed in claim 1, wherein said coating is a carbonaceous metal oxide coating in which elemental carbon acts as a matrix onto which manganese oxide is deposited.

9. The process as claimed in claim 1, wherein forming a nanocomposite coated electrode forms at least a portion of a supercapacitor cell containing an electrolyte selected from the group consisting of aqueous potassium hydroxide, aqueous disodium sulfate, and nonaqueous electrolytes.

* * * * *